(12) United States Patent
Park

(10) Patent No.: US 10,729,280 B2
(45) Date of Patent: Aug. 4, 2020

(54) MULTI-PURPOSE MICROWAVE COOKWARE

(71) Applicant: Jong Peter Park, Pasadena, CA (US)

(72) Inventor: Jong Peter Park, Pasadena, CA (US)

(*) Notice: Subject to any disclaimer, the term of this patent is extended or adjusted under 35 U.S.C. 154(b) by 990 days.

(21) Appl. No.: 14/797,100

(22) Filed: Jul. 11, 2015

(65) Prior Publication Data

US 2015/0313406 A1  Nov. 5, 2015

Related U.S. Application Data

(63) Continuation-in-part of application No. 13/681,071, filed on Nov. 19, 2012, now Pat. No. 9,119,233, which is a continuation-in-part of application No. 12/938,681, filed on Nov. 3, 2010, now Pat. No. 8,387,820.

(60) Provisional application No. 62/191,305, filed on Jul. 10, 2015, provisional application No. 62/175,408, filed on Jun. 14, 2015, provisional application No. 62/072,993, filed on Oct. 30, 2014.

(51) Int. Cl.
*A47J 36/02* (2006.01)
*A47J 36/04* (2006.01)
*A47J 36/06* (2006.01)
*A47J 27/00* (2006.01)
*H05B 6/64* (2006.01)

(52) U.S. Cl.
CPC .......... *A47J 36/027* (2013.01); *A47J 27/002* (2013.01); *A47J 36/04* (2013.01); *A47J 36/06* (2013.01); *H05B 6/6408* (2013.01); *H05B 6/6494* (2013.01)

(58) Field of Classification Search
CPC ...... H05B 6/64; H05B 6/6408; H05B 6/6494; A47J 36/02; A47J 36/025; A47J 36/027; A47J 36/06
USPC .......................... 219/725, 729; 99/323–345
See application file for complete search history.

(56) References Cited

U.S. PATENT DOCUMENTS

| | | | | |
|---|---|---|---|---|
| 3,941,967 A | * | 3/1976 | Sumi ..................... | A47J 36/027 219/729 |
| 4,977,302 A | * | 12/1990 | Merigaud ............ | H05B 6/6494 219/730 |
| 5,107,087 A | * | 4/1992 | Yamada ............. | B65D 81/3453 219/730 |
| 5,229,563 A | * | 7/1993 | Isogai ................... | A47J 27/088 219/686 |
| 5,396,052 A | * | 3/1995 | Petcavich .............. | A47J 36/04 219/725 |
| 5,508,498 A | * | 4/1996 | Rheinish ................ | A47G 21/02 219/730 |
| 5,515,995 A | * | 5/1996 | Allen ................. | A47G 19/2261 215/13.1 |
| 5,740,941 A | * | 4/1998 | Lemelson .............. | A47G 19/00 220/62.15 |

(Continued)

*Primary Examiner* — Lorne E Meade
*Assistant Examiner* — Ayub A Maye
(74) *Attorney, Agent, or Firm* — Bum Pak

(57) ABSTRACT

Some embodiments provide a multi-purpose microwave cooking apparatus. The cooking apparatus has a metallic vessel having a bottom surface, a side wall, and an edge. An open region is defined with the side wall extending from the bottom surface to the outer edge. In some embodiments, at least a portion of the outer side wall is coated with a layer of exothermic coating to insulate the vessel and generate thermal energy from microwave radiation.

17 Claims, 15 Drawing Sheets

(56) References Cited

U.S. PATENT DOCUMENTS

| | | | | |
|---|---|---|---|---|
| 6,320,166 | B1* | 11/2001 | Park | A47J 27/002 |
| | | | | 219/428 |
| 6,631,824 | B2* | 10/2003 | Park | A47J 27/002 |
| | | | | 220/573.1 |
| 7,104,413 | B2* | 9/2006 | Liu | A47J 41/0055 |
| | | | | 215/12.1 |
| 2003/0209154 | A1* | 11/2003 | Park | A47J 36/02 |
| | | | | 99/403 |
| 2004/0118838 | A1* | 6/2004 | Park | A47J 36/027 |
| | | | | 219/725 |
| 2005/0205577 | A1* | 9/2005 | Park | A47J 27/212 |
| | | | | 220/367.1 |
| 2007/0000915 | A1* | 1/2007 | Cheng | A47J 27/002 |
| | | | | 219/621 |
| 2011/0056957 | A1* | 3/2011 | Cheng | A47J 27/04 |
| | | | | 220/573.4 |
| 2012/0024845 | A1* | 2/2012 | Lee | C03C 8/02 |
| | | | | 219/725 |
| 2012/0080430 | A1* | 4/2012 | Hoff | A47J 36/06 |
| | | | | 220/212 |
| 2012/0223086 | A1* | 9/2012 | Mathieu | A47J 27/002 |
| | | | | 220/573.1 |

\* cited by examiner

1300

1400

1405

MULTI-PURPOSE MICROWAVE COOKWARE

CLAIM OF BENEFIT TO PRIOR APPLICATIONS

This application claims the benefit of U.S. Provisional Patent Application 62/072,993, filed Oct. 30, 2014. This application also claims the benefit of U.S. Provisional Patent Application 62/175,408, filed Jun. 14, 2015. This application also claims the benefit of U.S. Provisional Patent Application 62/191,305, filed Jul. 10, 2015. This application is also a continuation in part application of U.S. patent application Ser. No. 13/681,071, filed Nov. 19, 2012, and published as U.S. Patent Application Publication 2014013837. U.S. patent application Ser. No. 13/681,071 is a continuation in part application of U.S. patent application Ser. No. 12/938,681, filed Nov. 3, 2010, and issued as U.S. Pat. No. 8,387,820. U.S. Patent Applications 62/072,993, 62/175,408, and 62/191,305; U.S. Patent Application Publication 2014013837; and U.S. Pat. No. 8,387,820 are incorporated herein by reference.

BACKGROUND

Today, many people use microwave ovens. A person can use one from nearly anywhere (e.g., at home, at work, at the store, etc.). One of the primary reasons for their popularity is because they can conveniently and safely heat food, including beverages. A microwave oven heats food by bombarding it with electromagnetic radiation in the microwave spectrum causing polarized molecules in the food's water content to oscillate back and forth, and thereby generate thermal energy. This microwave cooking process is also known as dielectric heating.

Despite their popularity, microwave ovens or, more specifically, microwave cooking has a number of problems. For instance, microwave cooking can result in food becoming dry, or partially or unevenly heated. In addition, the cooking time can be very long, and the food can lose its original taste after being heated in the microwave oven. The main cause of these problems is due to how the microwave oven heats food through oscillation.

Furthermore, it is commonly advised to avoid placing metal containers in a microwave oven because the electromagnetic waves cannot pass through the metal, unlike glass, plastic, and paper. There is also the possibility that the oscillation of the electromagnetic waves may produce a concentrated electric field at the edge of the metal object. If that edge is in close proximity with another metallic object, sparks may appear between the two objects because of that concentration.

BRIEF SUMMARY

Embodiments described herein provide a multi-purpose microwave cooking apparatus. The cooking apparatus has a metallic vessel having a bottom surface, a side wall, and an edge. An open region is defined with the side wall extending from the bottom surface to the outer edge. In some embodiments, at least a portion of the outer side wall is coated with a layer of exothermic coating to insulate the vessel and generate thermal energy from microwave radiation.

In some embodiments, the cooking apparatus includes a heating element adapted to further generate thermal energy from microwave radiation. The heating element has a top face that is attached to the outer bottom surface of the vessel so as to distribute heat along the bottom of the vessel. In some embodiments, the heating element is a mixture of elastic material and ferrite particles. In some embodiments, the heating element is ferrite rubber.

As mentioned above, at least a portion of the outer side wall of the vessel is coated with a layer of exothermic coat. In some embodiments, the outer bottom surface of the vessel is also coated with the same exothermic coat. The exothermic coat of some embodiments is an exothermic glaze having a mixed metal powder compound (e.g., $Fe_2O_3$) with ferrosilicon (Fe—Si) powder, aluminum silicate powder, and ethylene glycol.

Instead of the exothermic glaze, the cookware of some embodiments is coated with a ceramic coat. The ceramic coat of some embodiments is a mixture of ceramic powder and exothermic particles. In some embodiments, the exothermic particles include iron oxide ($Fe_2O_3$) powder with Manganese (Mn) and Zinc (Zn) powder, or copper-nickel-zinc (Cu—Ni—Zn) powder for electro-microwave absorption.

In some embodiments, the cooking apparatus has a see-through lid adapted to cover the vessel. The see-through lid of some embodiments has a glass disk that is surrounded by a non-metallic rim. The non-metallic rim includes an elastic ring that fits into the vessel and sits on the edge of the vessel to substantially seal the container. At least one vent hole is formed on the lid to allow heated moisture to escape the vessel without disengaging the lid from the vessel. In some embodiments, the non-metallic rim is a silicone rubber rim, and the elastic ring is a silicone ring that is formed on the silicone rim. In some embodiments, the lid is made with silicone rubber mixed with exothermic particles.

In some embodiments, the cooking apparatus has a metallic lid that is formed to cover the vessel. The lid has a metal disk coupled with an elastic ring. The elastic ring is attached to the outer edge of the metal disk and sits between the metal disk and the vessel when the lid is placed over the vessel. This is so that the metal disk does not make contact with the vessel, and that there is a predetermined amount of space between the outer edges of metal disk and the vessel. The elastic ring and the spacing between the outer edges prevent arcing or sparks from appearing between the outer edges of the lid and the vessel. In some embodiments, the metallic lid is dome-shaped. The dome may be shaped to have a predetermined height to allow the apparatus to be used for roasting purposes.

In some embodiments, the cooking apparatus has a steamer insert to steam food items. In some such embodiments, the vessel has an upper outer edge and a lower inner edge. The elastic ring sits on the upper outer edge of the vessel, and the steamer insert sits on lower inner edge of the vessel.

In some embodiments, the microwave cookware has a dual wall structure, including inner and outer shells. The inner shell is disposed adjacent the outer shell and edges of the shells are sealed to form a cavity between the shells. In some embodiments, the cavity includes a fibrous or a microporous medium to insulate the cookware. The outer shell may be covered with an exothermic outer layer that includes at least one of an exothermic ceramic coat, an exothermic glaze coat, a heat-resistant plastic mixed with a first set of exothermic particles, a heat-resistant rubber (e.g., silicone rubber) that is mixed with a second set of exothermic particles.

In some embodiments, the microwaveable cookware has a microwave-heating plate disposed between the inner and outer shells. The heating plate may be exposed along a bottom side of the container to absorb microwaves and convert the microwaves to heat.

In some embodiments, the cavity of the dual wall vessel has exothermic material to absorb microwave radiation. A piece of ferrite rubber may be attached to the inner shell. The inner shell may be coated with an exothermic glaze or an exothermic ceramic coat.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
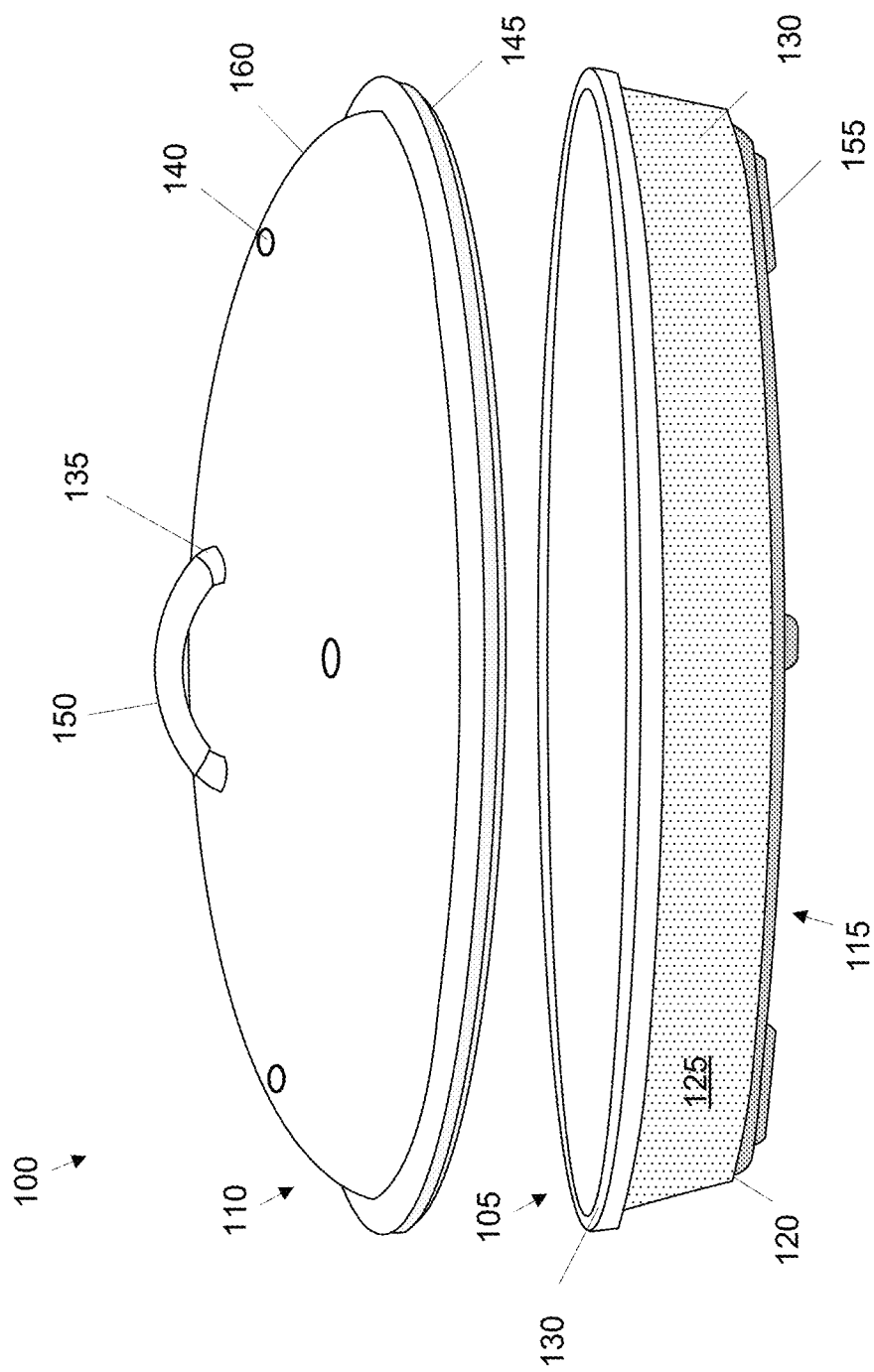
FIG. 1 illustrates an exploded view of a microwave cooking apparatus according to some embodiments of the invention.

Some embodiments described herein provide a multi-purpose microwave cooking apparatus. The microwave cooking apparatus (also referred to herein as microwave cookware) is multi-purpose in that it can be used to cook food differently. This includes frying, roasting, steaming, and baking FIG. 1 illustrates an exploded view of a microwave cooking apparatus according to some embodiments of the invention. FIG. 1 will be described by reference to FIG. 2 that shows the different layers of the microwave cooking apparatus.

As shown in FIG. 1, the apparatus 100 has a vessel 105, a lid 110, and a heating element 115. In some embodiments, the vessel 105 is metallic, and has a bottom surface 120, a side wall 125, and an edge 130. An open region is defined with the side wall extending from the bottom surface to the outer edge. In some embodiments, at least a portion of the outer side wall is coated with a layer of exothermic coating 130 to insulate the vessel and generate thermal energy from microwave radiation.

In some embodiments, the cooking apparatus 100 includes a heating element 115 adapted to further generate thermal energy from microwave radiation. The heating element 115 has a top face that is attached to the outer bottom surface of the vessel so as to distribute heat along the bottom of the vessel. In some embodiments, the heating element 115 is a mixture of elastic material and ferrite particles. In some embodiments, the heating element 115 is ferrite rubber. The ferrite rubber can potentially provide exothermic heat at least up to 280° Celsius (C). In some embodiments, several legs 155 are formed on a bottom face of the elastic material to raise the vessel in order to prevent rapid heat loss. Additional details relating to such a heating element will be described below by reference to FIGS. 13-16.

In some embodiments, at least a portion of the outer side wall 125 of the vessel is coated with a layer of exothermic coating 130. In some embodiments, the outer bottom surface 120 of the vessel is also coated with the exothermic coating. The exothermic coating 130 of some embodiments is an exothermic glaze having ferrite, silicon (Si), and aluminum (Al) particles. In some embodiments, the exothermic materials include ferrite powder, Mn, Zn, silicon oxide ($SiO_2$), Si, and aluminum oxide ($Al_2O_3$). In some embodiments, the exothermic coating is an exothermic glaze having a mixed metal powder compound (e.g., $Fe_2O_3$) with ferrosilicon (Fe—Si) powder, aluminum silicate powder, and ethylene glycol.

Instead of the exothermic glaze, the vessel 105 of some embodiments is coated with a ceramic coat. The ceramic coat of some embodiments is a mixture of ceramic powder and exothermic particles. In some embodiments, the exothermic particles include ferrite powder. In some embodiments, the exothermic particles also includes manganese zinc (MnZn) powder, magnesium copper zinc (MgCuZn) powder, and nickel zinc (NiZn) powder. As mentioned above, the exothermic materials include ferrite powder, Mn, Zn, silicon oxide ($SiO_2$), Si, and aluminum oxide ($Al_2O_3$). In some embodiments, the exothermic particles include Fe2O3 powder with Manganese (Mn) and Zinc (Zn) powder, or copper-nickel-zinc (Cu—Ni—Zn) powder for electro-microwave absorption.

Figure 2:
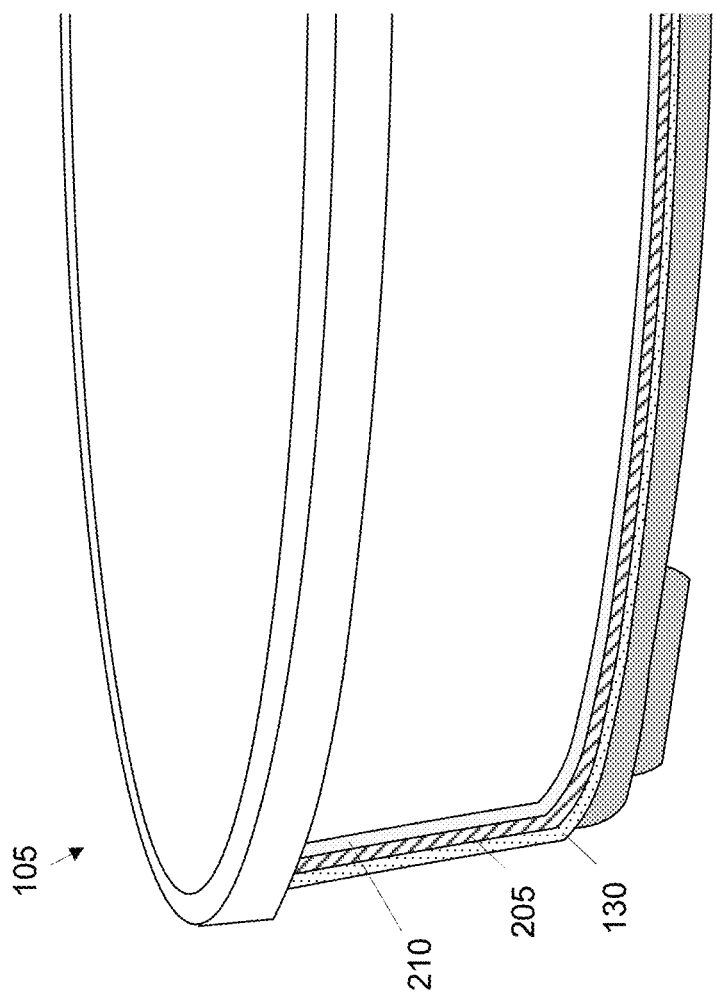
FIG. 2 shows a cross-sectional view of the different layers of the vessel of the microwave cooking apparatus of FIG. 1.

FIG. 2 shows the different layers of the vessel of the microwave cooking apparatus of FIG. 1. As shown, the vessel includes a metallic body 205. In some embodiments, the vessel is formed using aluminum, stainless steel, copper, carbon steel, and/or clad metal. In some embodiments, the inner area is coated with a layer of non-stick coating 210. Specifically, the inner bottom surface and the inner side wall are coated with the non-stick coat 210. As stated above, the metallic body 205 may be coated with an exothermic glaze 130 or a ceramic coat.

Referring to FIG. 1, the cooking apparatus 100 includes a lid 110. The lid has a handle 135 to handle the lid. A person can use the handle to place the lid over the vessel or remove it from the vessel. At least one vent hole 140 is formed on the lid to allow heated moisture to escape the vessel without disengaging the lid from the vessel. In some embodiments, the handle 135 is wrapped with a protective member 150 to make the handle safe to touch when the vessel 105 is heated. In some embodiments, the protective member is made of silicone rubber.

In some embodiments, the lid 110 has a metal disk 160 made of metal to reflect microwave radiation. This is to prevent food being cooked with microwaves. In some embodiments, the metal is stainless steel. The metal disk can be carbon steel, aluminum, stainless steel, copper, and/or clad metal. As shown, the metal disk can be dome-shaped.

In some embodiments, the lid is coated with the exothermic glaze or ceramic coat. By coating the lid, the microwavable cookware of some embodiments generates heat from all sides. For example, the coat on the lid and vessel generate thermal energy from microwave radiation. Similar to a gas or electric oven, the cookware can cook a food item from all sides.

The lid 110 has an elastic ring 145 to fit into the vessel to substantially seal the container. The elastic ring 145 is attached to the outer edge of the metal disk and sits between the metal disk and the vessel when the lid is placed over the vessel. This is so that the metal disk does not make contact with the vessel, and that there is a predetermined amount of space between the outer edges of metal disk and the vessel in order to prevent arcing or sparks from appearing between the outer edges of the lid and the vessel. In some embodiments, the elastic ring 145 is a silicone rubber ring.

The elastic ring can be coupled to the lid in various different ways. For instance, the elastic ring can be glued to the lid. Alternatively, the lid may be shaped to hold the elastic ring.

Figure 3:
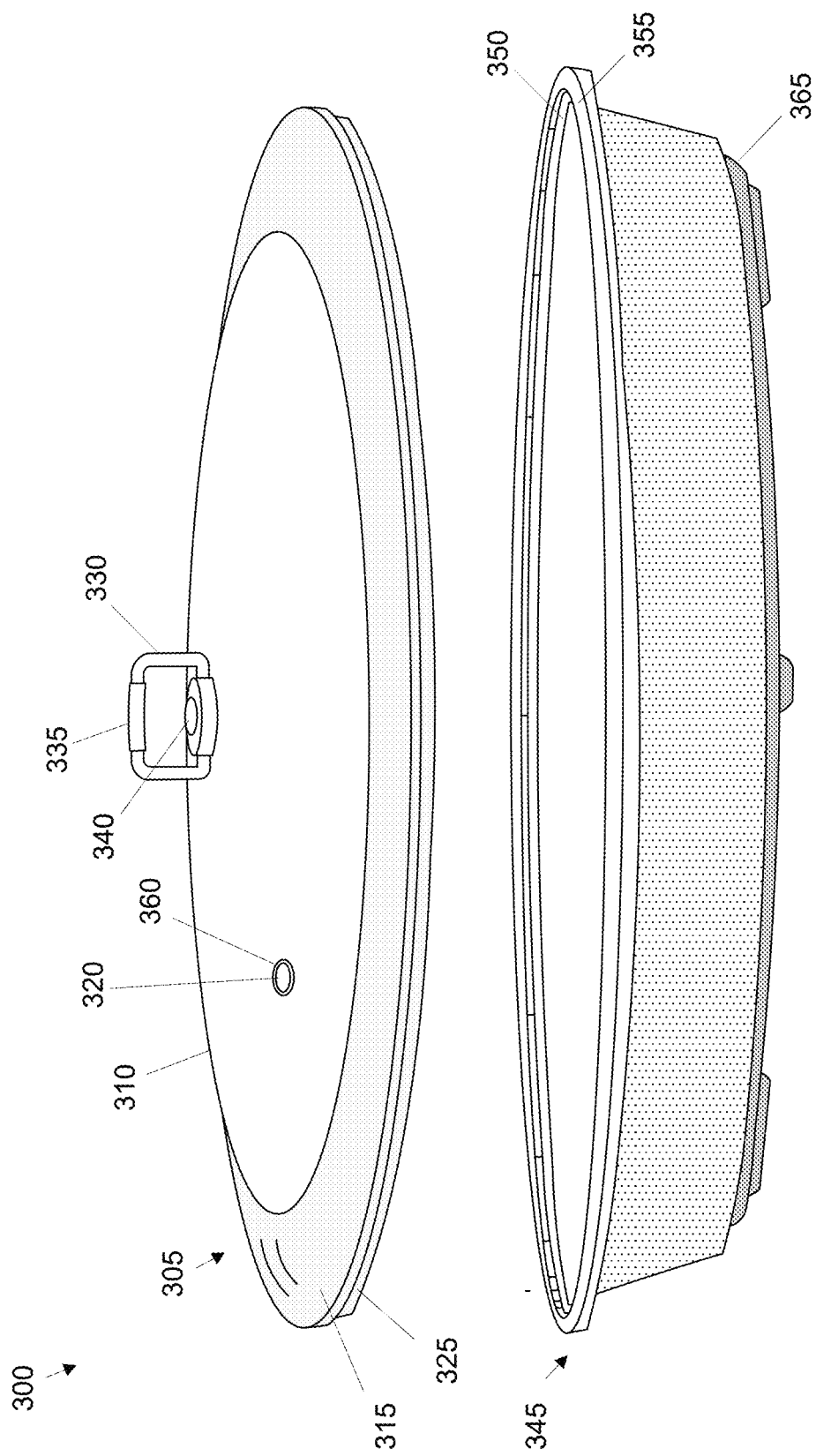
FIG. 3 illustrates a see-through lid of the microwave cooking apparatus according to some embodiments.

In some embodiments, the cooking apparatus has a see-through, or a look and cook lid adapted to cover the vessel. FIG. 3 illustrates a see-through lid 305 of the microwave cooking apparatus 300 according to some embodiments. The see-through lid 305 of some embodiments has a glass disk 310 that is surrounded by a non-metallic rim 315. The glass may be tempered glass. The figure also shows a vessel 345. Attached to the vessel is the heating element 365 that is described above by reference to FIG. 1.

The glass disk 310 may be dome-shaped. In the example of FIG. 3, the glass disk is slightly dome-shaped, which makes the apparatus 300 ideal for frying food with a microwave oven. At least one vent hole 320 is formed on the lid 305 to allow heated moisture to escape the open area of the vessel 345 without disengaging the lid from the vessel. In the illustrated example, only one vent hole 320 is formed on the glass disk. A metal ring 360 is placed in the vent hole in order to protect the glass disk 310.

In some embodiments, the lid 305 has a handle 330 to place the lid on the container (i.e., vessel) or remove the lid from container. As shown in FIG. 3, a hole is formed on the center of the glass disk 310, and a coupling member 340 is inserted in the hole to couple the glass disk to the handle 330. The handle 330 is wrapped with a protective member 345 to make the handle safe to touch when the vessel is heated. In some embodiments, the protective member 345 is a piece of silicone rubber that wraps around the handle portion of the handle 330. The handle portion being the surface area that a person can pick up when the vessel is heated.

The non-metallic rim 315 includes an elastic ring 325 that fits into the vessel 345 and sits on the edge 350 of the vessel to substantially seal the container. In some embodiments, the non-metallic rim 315 is a silicone rim, and the elastic ring is a silicone ring formed on the silicone rim. In some embodiments, the silicone rim and ring are just one piece of silicone rubber that is shaped to hold the glass disk. For instance, the silicone rim can have an open space to insert the glass therein.

In the example of FIG. 3, the non-metallic rim 315 serves multiple purposes. First, the non-metallic rim 315 supports and protects the glass disk 310. Second, the non-metallic rim 315 is used to prevent sparks from appearing between edges of two metal pieces when the microwave is turned on with the apparatus 300 in it.

In some embodiments, the lid's silicone rubber is mixed with exothermic particles. This is to allow the lid to generate heat from microwave radiation. Instead of silicone rubber, the cookware of some embodiments has a heat resistant plastic lid. For instance, the silicone rim can be made with polyphenylene sulfide (PPS) or syndiotactic polystyrene (SPS) plastic. Like the silicone rubber, the PPS or SPS plastic may be mixed with exothermic particles to generate heat from electromagnetic waves.

In some embodiments, the vessel 345 has an upper outer edge 355 and a lower inner edge 350. In some embodiments, the non-metallic rim 315 has a size (e.g., diameter, radius, and circumference) that allows the rim to fit into the vessel 345. This is so that the silicone ring 325 sits on the lower inner edge 350.

Figure 4:
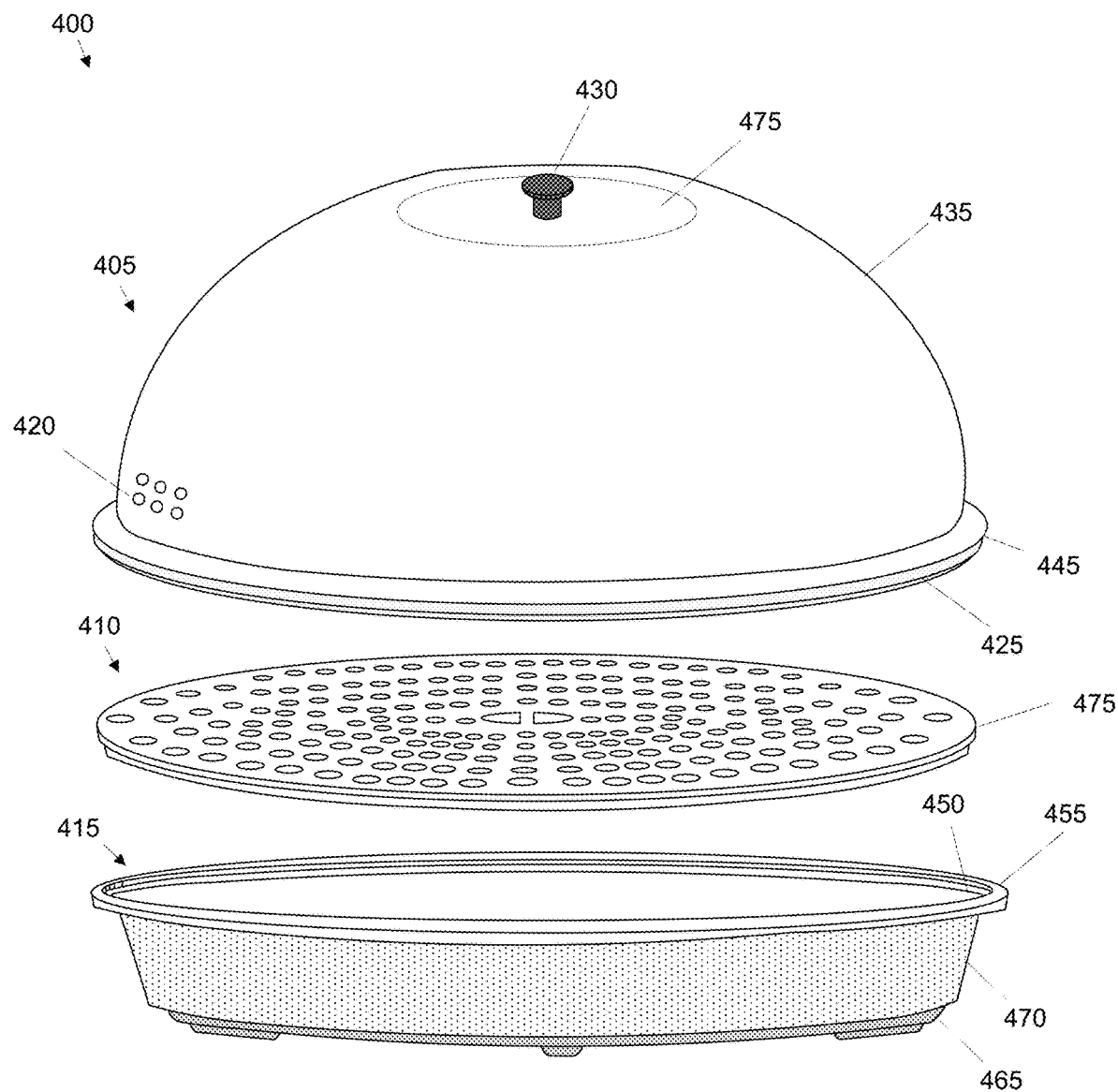
FIG. 4 illustrates a metallic lid and a steamer insert of the microwave cooking apparatus according to some embodiments.

In some embodiments, the cooking apparatus has a metal roaster lid and a steamer insert. FIG. 4 illustrates a metallic lid 405 and a steamer insert 410 of the microwave cooking apparatus 400 according to some embodiments. The figure also shows a vessel 415 that is similar to the one described above by reference to FIG. 1. Attached to the vessel 415 is a heating element 465 that is described above by reference to FIG. 1.

As shown in FIG. 4, the cooking apparatus of has a lid 405 that is formed to cover the vessel. The lid 405 is made with a metal disk 435. The metal disk can shield a food item by reflecting microwaves. In other words, the metal disk prevents the food item being cooked with the microwaves. In some embodiments, the metal is stainless steel. The metal disk 435 can be carbon steel, aluminum, stainless steel, and/or copper.

The metal disk 435 is coupled to an elastic ring 425. The elastic ring 425 is attached to the outer edge 445 of the metal disk 435. The elastic ring 425 sits between the metal disk and the vessel 415 when the lid 405 is placed over the vessel. This is so that the outer edge 445 of the metal disk 435 does not make contact with the vessel. Also, there is a predetermined amount of space between the outer edges of metal disk and the vessel. These are all features of the lid to prevent arcing or sparks from appearing between the outer edges of the lid and the vessel.

In some embodiments, the cookware uses a non-metallic disk. In some embodiments, the lid is made primarily with polyphenylene sulfide (PPS) plastic. In some embodiments, the lid is made of plastic engineered with syndiotactic polystyrene (SPS) resin. In some embodiments, the lid has a silicone rubber disk.

The silicone rubber, PPS plastic, or SPS plastic may be mixed with exothermic particles. For instance, the disk may be made by mixing PPS polymer with exothermic particles. In some embodiments, the exothermic particles include ferric oxide (Fe2O3) powder with Manganese (Mn) and Zinc (Zn) powder, or copper-nickel-zinc (Cu—Ni—Zn) powder. The exothermic particles are for electro-microwave absorption to generate heat.

In some embodiments, the cookware has a lid that is coated with an exothermic glaze or an exothermic ceramic coat. For instance the lid may be coated with a ceramic coat that is blended with exothermic particles (e.g., Fe2O3, and Mn and Zn powder, or Cu—Ni—Zn powder). As another example, the lid may be coated with an exothermic glaze having a mixed metal powder compound (e.g., Fe2O3) with ferrosilicon (Fe—Si) powder, aluminum silicate powder, and ethylene glycol.

In some embodiments, the cookware's lid 405 is dome-shaped. In the example of FIG. 4, the dome is a high-dome or is shaped to have a predetermined height. This allows the apparatus to be used for roasting purposes. For example, the cookware shown in the figure can be used to roasting purposes (e.g., roasting poultry). Thermal energy is generated from the heating element 465 and the outer coat 470 being exposed to microwave radiation. The energy is then transferred to the inner areas of the body of the vessel. As indicated above, the lid may also generate heat from microwave radiation.

As shown, at least one vent hole 420 is formed on the lid 405 to allow heated moisture to escape the open region of the vessel 415 without disengaging the lid from the vessel. In the example of FIG. 4, six vent holes are placed on the side of the dome-shaped lid. The lid 405 also has a handle 430. A hole is formed on the center of the metal disk 435, and a coupling member (not shown) is inserted in the hole to couple the handle 430 to the metal disk. The coupling member can be a screw. If there is a screw, there can also be a washer so that the handle 430 does not easily unscrew. In some embodiments, a surrounding area 475 where the handle 430 is coupled to the plate 435 can be depressed. This is mainly done to save space (e.g., for the cookware to fit into a small microwave oven).

In some embodiments, the microwave cookware further includes a steamer insert to steam food items. In some embodiments, the steamer insert is made of metal. The metal can be aluminum, stainless steel, copper, carbon steel, and/or clad metal. Alternatively, the steamer insert can be made of plastic. In the example of FIG. 4, the steamer insert includes a number of steam holes. Different sections of the steamer can be raised or lowered to allow steam to flow different directions and/or provide places for food (e.g., vegetables) to sit.

In some embodiments, the vessel has an upper outer edge 455 and a lower inner edge 450. In some embodiments, the lid 405 sits over the upper outer edge 455 of the vessel 415, and the steamer insert 410 sits on lower inner edge 450 of the vessel. In the example cookware 400 of FIG. 4, the elastic ring 425 of the lid 405 sits on the outer edge 455, and the outer edge 475 of the steamer insert 410 sits on the lower inner edge 450 of the vessel 415.

In some embodiments, the microwave cooking apparatus has a lid that is coated with an exothermic glaze or a ceramic coat. The coating on the lid further insulates the vessel and generates heat from microwave radiation. In some embodiments, the coating on the lid further provides an upper heat generation layer. This is particularly useful in cases where the cookware is used for baking purposes as heat is coming from all directions of the vessel.

Figure 5:
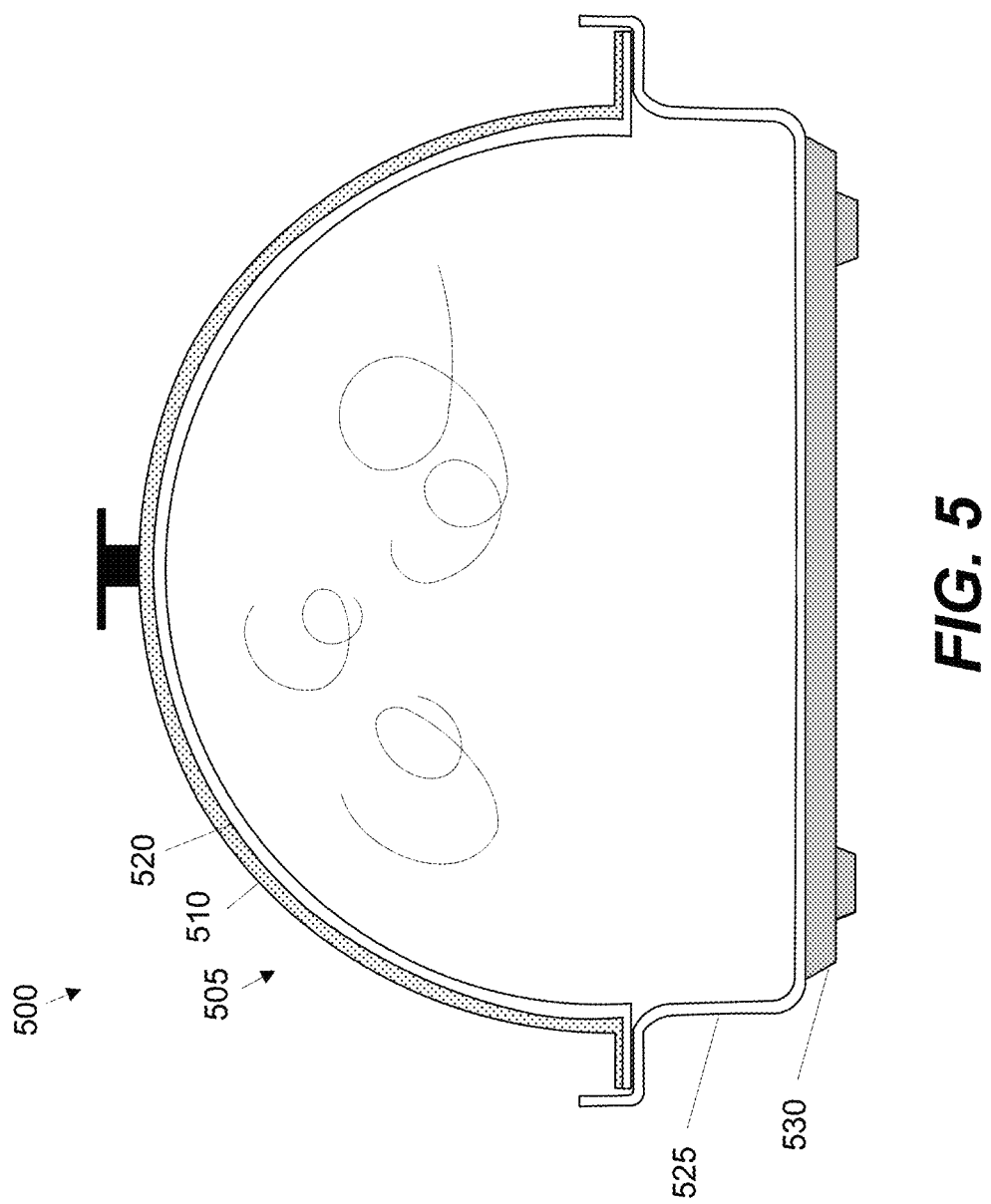
FIG. 5 illustrates another metallic lid of the microwave cooking apparatus according to some embodiments.

FIG. 5 illustrates a lid 505 of the microwave cooking apparatus 500 according to some embodiments of the invention. The figure also illustrates a vessel 525 (i.e., container) that is similar to the one described above by reference to FIG. 1. Attached to the vessel 525 is a heating element 530 that is the same as the one described above by reference to FIG. 1.

As shown in FIG. 5, the lid 505 has a plate 520 that is coated with an exothermic glaze 510 or a ceramic coating. In some embodiments, the lid is coated with an exothermic ceramic coat having exothermic particles. In some embodiments, the exothermic particles have ceramic powder and ferrite. In some embodiments, the exothermic particles also has manganese zinc (MnZn) powder, magnesium copper zinc (MgCuZn) powder, and nickel zinc (NiZn) powder. In some embodiments, the exothermic particles include Fe2O3 powder with Manganese (Mn) and Zinc (Zn) powder, or copper-nickel-zinc (Cu—Ni—Zn) powder for electro-microwave absorption.

In some embodiments, the lid is coated with an exothermic glaze. The glaze of the cookware of some embodiments is a mixed metal alloy powder compound comprising ferrite, silicon (Si), and aluminum (Al). In some embodiments, the exothermic glaze includes a mixed metal powder compound (e.g., Fe2O3) with ferrosilicon (Fe—Si) powder, aluminum silicate powder, and ethylene glycol.

Figure 6:
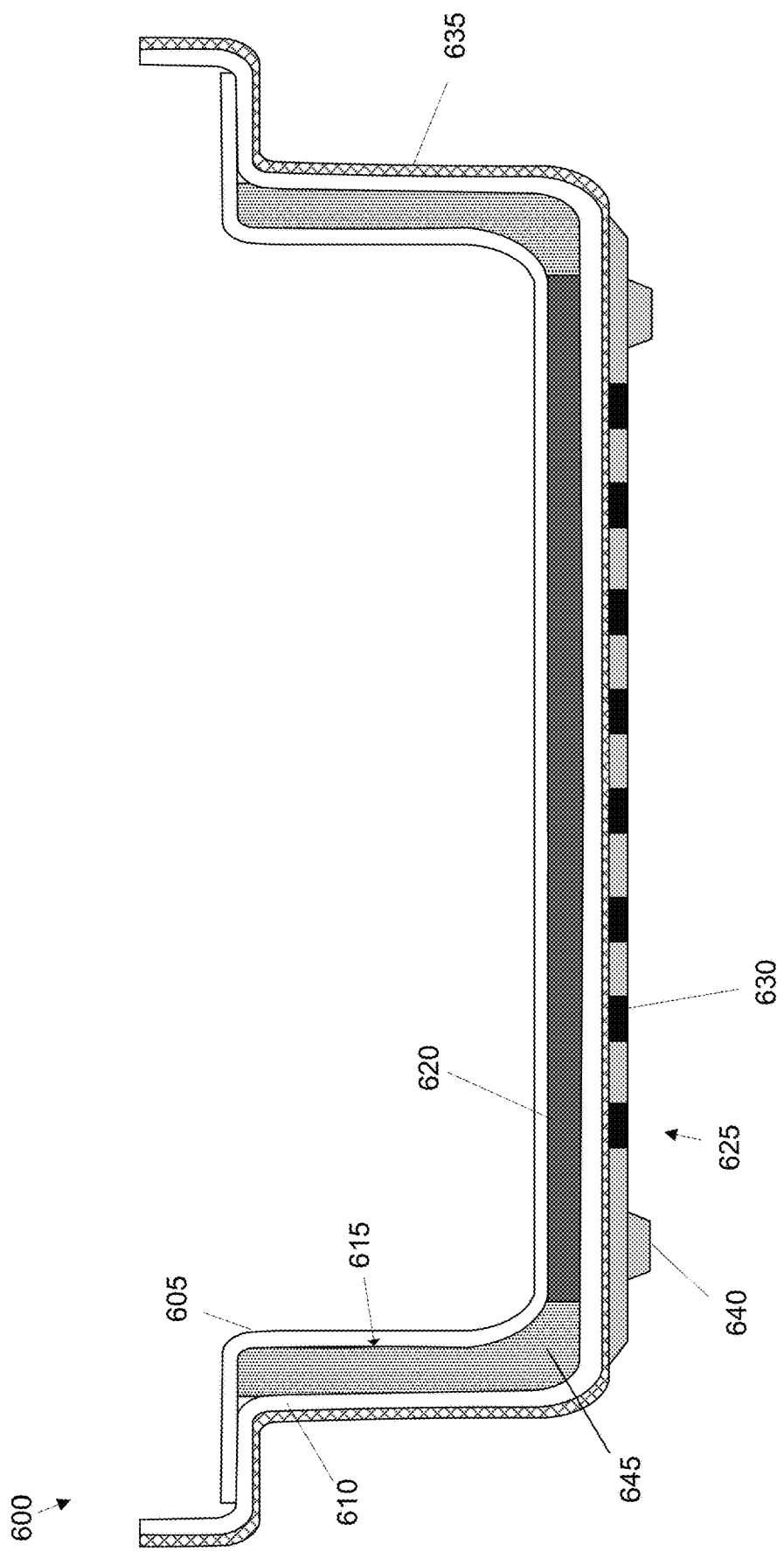
FIG. 6 illustrates a double walled vessel of the microwave cooking apparatus according to some embodiments.

In some embodiments, the microwave cooking apparatus has double wall structure. FIG. 6 illustrates a double walled vessel 600 of the microwave cooking apparatus according to some embodiments. The inner shell 605 is disposed adjacent the outer shell 610 and the edges of the shells are (e.g., hermetically) sealed to form a cavity 615 (also referred to herein as inner space, a thermal dynamic layer, inner chamber) between the two shells. In some embodiments, the cavity 615 is filled at least partially with a thermal conductive medium 645 to form a thermodynamic layer that can absorb and retain heat for an extended period time. In some embodiments, the inner or outer shell is made using at least one of aluminum, stainless steel, carbon steel, copper, and clad metal. The double walled vessel 600 of some embodiments can heat up to about 450° Celsius (C) with a microwave oven.

Different embodiments can use different thermal conductive mediums. In some embodiments, the microwave cookware uses a gaseous medium, such as ambient air. In some embodiments, the inner space is at least partially filled with a compound, such as silicone oil.

In some embodiments, the inner space is at least partially filled with a fibrous medium, such as carbon fiber. The inner space may have a piece of fiberglass woven fabric for insulation. The fiberglass woven fabric may have a honeycomb form. For instance, the fabric can have a number of cells that are similar in appearance to those of a bee's honeycomb. The honeycomb fiberglass fabric may be used because it is lightweight, fire resistant, flexible, and has good impact resistance.

In some embodiments, the fibrous medium includes ceramic wool fiber for insulation. In some embodiments, the inner space has a piece of material made with ceramic fiber. In some embodiments, the inner space the material is a ceramic fiber blanket or mat. The blanket is a lightweight, thermally efficient ceramic fiber insulating material that has dimensional stability at high temperature. In some embodiments, the blanket is made from high-purity alumina, zirconia, and silica spun ceramic fibers. In some embodiments, the blanket has a temperature grade around or above 760° Celsius (C).

In some embodiments, the fibrous medium includes glass cloth.

In some embodiments, the inner space 615 includes a quilted panel. The panel may be made using glass cloth. The panel may be sewn into a pillow-like shape and filled with silica powder mixture. The panel may be sewn first closed and then compressed. The sewing technique allows the panel to be flexible. For instance, the quilted panel can be wrapped around the outer side wall of the inner shell of the double-walled vessel. The panel can also withstand abuse that the cookware is subject. That is, the panel is resistant to various vibration and motion of the vessel. Depending on the size of the inner chamber, the thicknesses of the panel may change.

In some embodiments, inner space 615 contains a thin sheet of micro-porous insulation material. The thin sheet may be made with a micro-porous board material. As the board can be delicate, it might be coated in some manner to reinforce the board material. The thin sheet may be made primarily with pyrogenic silica. The thin sheet may be reinforced in some manner (e.g., with e-glass filament, oxide opacifier, etc.).

In some embodiments, the inner space 615 includes a piece of foam to keep food items hot for several hours. In some embodiments, the foam is made of polyurethane. In some embodiments, the inner space is at least partially filled with a chemical gel. In some embodiments, the chemical gel includes ammonium nitrate, calcium chloride, sodium chloride, sodium acetate, and ammonium chloride. One of the benefits of using such a gel is for its endothermic performance or its ability to absorb heat. That is, the gel can be used to keep food cold for an extended period of time.

As shown in FIG. 6, the inner space may be fully filled with the thermal conductive medium. As a first example, the inner space may be filled with the above-mentioned fibrous medium. As another example, the inner space may be filled with the thin sheet of microporous material.

In some embodiments, the inner space is at least partially filled with a set of one or more thermal conductive pads. The inner space can be filled at least partially with a thermal conductive gel. For faster heat absorption and transfer, the inner space may include a silicone-based material that is mixed with an aluminum oxide compound. In some embodiments, the inner space is at least partially filled with a silicone rubber having ferrite particles (e.g., manganese zinc (MnZn) ferrite particles).

In some embodiments, the cookware 600 has pressure relief valve installed on the outer shell. This is to relive pressure built up in the cavity 615 between the inner and outer shells 605 and 610.

In some embodiments, the microwave cooking apparatus 600 has an exothermic plate 620. The exothermic plate 620 generates and transfers heat. In some embodiments, the exothermic plate 620 is placed in the cavity between the inner and outer shells. In particular, the plate is placed between the outer bottom surface of the inner shell and the inner bottom surface of the outer shell. In some embodiments, the plate makes contact with both shells to transfer heat to both shells. In some embodiments, the outer shell 610 has an opening (e.g., an open circle) to expose the plate 620 to microwave radiation.

In some embodiments, the exothermic plate 620 is formed with exothermic clay ceramic. In some embodiments, the ceramic clay has ferrite powder. In some embodiments, the plate has clay ceramic powder mixed with iron oxide powder ($Fe_2O_3$) powder and magnesium-Zinc (Mn—Zn) silicate powder. In some embodiments, the plate is made with clay ceramic powder mixed with iron (III) oxide powder ($Fe_2O_3$) powder and copper-nickel-zinc (Cu—Ni—Zn) powder for electro-microwave absorption. In some embodiments, the clay ceramic includes at least one of manganese zinc (MnZn) powder, magnesium copper zinc (MgCuZn) powder, and nickel zinc (NiZn) powder. Instead of $Fe_2O_3$, some embodiments use $Fe_3O_4$ (iron (II,III) oxide) powder. In some embodiments, the plate is made of ferrite silicone mixture and $Fe_3O_4$ powder.

FIG. 6 also shows a heating element 625 according to some embodiments of the invention. The heating element 625 is similar to the one described above by reference to FIG. 1. However, in FIG. 6, the heating element 625 includes a number of vent holes 630. A set of one or more vent holes 630 can be formed on the elastic heating element to prevent disfigurement of the heating element. Also, when there is an opening along the bottom of the outer shell, heated air or moisture can come out of the cavity through the vent holes.

Further, as shown in FIG. 6, the heating element 625 may be supported or raised by a number of supporting members 640 or legs. In some embodiments, the supporting members 640 are formed on the bottom of the heating element.

In some embodiments, the cookware's vessel is covered at least partially with a thermal exothermic layer 635. In some embodiments, the layer serves multiple purposes. The layer may insulate the vessel by trapping heat. The layer may make the vessel safe to touch when heated. Different embodiments use different materials for the outer layer. In some embodiments, the outer layer has heat resistance up to and excess of 260° C. In some embodiments, the layer is composed of polystyrene such as syndiotactic polystyrene (SPS) plastic. In some embodiments, the layer is composed of a polymer such as polyphenylene sulfide (PPS) plastic. In some embodiments, the layer is made using silicone rubber. To enhance the exothermic properties of the vessel, the PPS, SPS, or silicone rubber may be mixed with exothermic particles.

In some embodiments, the cookware's outer shell is coated with an exothermic glaze or exothermic ceramic coat. The glaze or coat may be covered over with PPS or SPS plastic. The glaze or coat may be covered with a piece of silicone rubber. The PPS plastic, SPS plastic, or silicone rubber material may be mixed with exothermic particles for additional exothermic performance.

In some embodiments, the inner space of the multi-layered container 600 is at least partially filled with a reactive medium or material that absorbs one or more different gaseous mediums, such as the ambient air mentioned above, and holds the gaseous mediums for an extended period of time. This is to improve and maintain a vacuum inside the sealed inner space. The reactive material of some embodiments can absorb different types of gas molecules, such as $H_2O$, $O_2$, $N_2$, CO, $CO_2$, etc.

When a gaseous medium makes contact with the reactive material, the gaseous medium is combined with the reactive material through a chemical reaction. The reactive material essentially absorbs or eliminates even small amounts of gas molecules from the inner space. In some embodiments, the reactive material is getter that can absorb heated air and retain it for several hours. In some embodiments, a deposit of getter material is placed in the inner space of the multi-layered container. In some embodiments, the getter comprises zirconium (Zr). In some embodiments, the getter is primarily zirconium-based in amount or volume but can include one or more other elements, e.g., aluminum (Al), cobalt (Co), iron (Fe), etc.

Figure 7:
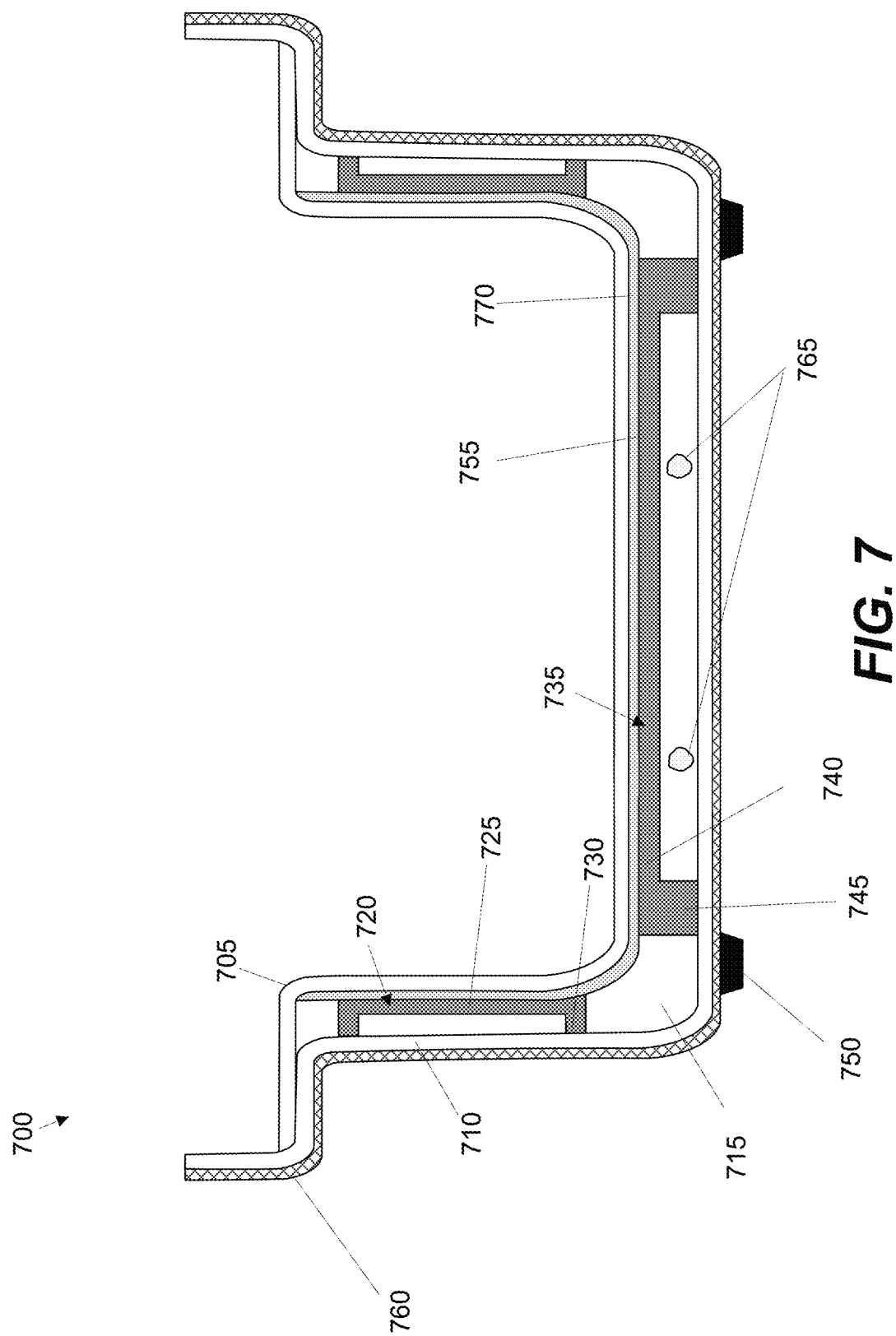
FIG. 7 illustrates a double walled vessel of the microwave cooking apparatus according to some embodiments.

In some embodiments, the reactive material is injected or placed in the inner chamber of the multi-layer container with one or more of the thermal conductive material listed above. FIG. 7 illustrates a container of the microwave cooking apparatus according to some embodiments. Specially, the figure shows a thermodynamic layer 715 that has getter 765. In the illustrated example, the microwave cooking container 700 is a thermal microwave cooking vessel in that it can retain heat for an extended period of time.

When the multi-layered container 700 is heated, the air within the thermodynamic layer 715 is heated, and the air molecules are absorbed by getter 765. The getter 765 can retain the heated air for several hours, similar to a thermal flask. For instance, when getter 765 is placed in the thermodynamic layer with ambient air, the multi-layered container may remain heated for about 5 to 6 hours. In some embodiments, the inner space has getter and ambient air. In some embodiments, the inner space has getter and silicone oil. In some embodiments, the inner space has getter and a fibrous medium (e.g., ceramic wool). In some embodiments, the inner space 715 has getter 765 and one or more other thermal conductive mediums described above by reference to FIG. 6.

In some embodiments, the thermal microwave cooking vessel 700 has a set of one or more support structures 720 and 735. In some embodiments, a support structure (720 or 735) is made with a piece of silicone rubber. The support structures 720 and 735 prevent the disfigurement of the inner and outer shells. Therefore, they protect the integrity of the thermal dynamic layer 715. Each support structures can include a surface area (725 or 755) that is supported by a bottom support member (730 or 745). In some embodiments, the cookware includes a round support structure 720 that fits around the inner shell 705. The surface area 725 730 may be in contact with the outer side wall of the inner shell 705. The support member 730 may be in contact with the inner side wall of the outer shell 710.

In some embodiments, the cookware 700 includes a plate-like support structure 735 that is disposed in between the outer bottom surface of the inner shell 705 and the inner bottom surface of the outer shell 710. The top 755 of the support plate 735 may make contact with the outer bottom surface of the inner shell 705. One or more bottom support members 745 may be formed on the plate 735. The bottom support member 745 may touch the inner bottom surface of the outer shell 710.

In some embodiments, the cookware's inner shell 705 is covered at least partially with an exothermic glaze 770 or a ceramic coat that is described above by reference FIGS. 1 and 2. In the example of FIG. 7, the outer bottom surface and the outer side wall of the inner shell 705 is coated with the exothermic glaze 770. In some embodiments that coat the inner shell 705, there can be an open region in the outer shell 710. The opening exposes the exothermic glaze 770 to microwave radiation. In some embodiments, the opening is a round circle along the bottom surface of the outer shell 710.

As indicated above, in some embodiments, the cookware's outer shell 710 is covered at least partially with a thermal exothermic layer 760. The exothermic layer 760 is described above by reference to FIG. 6. Finally, in the example of FIG. 7, a number of legs 750 are attached to the double walled container 700.

Figure 8:
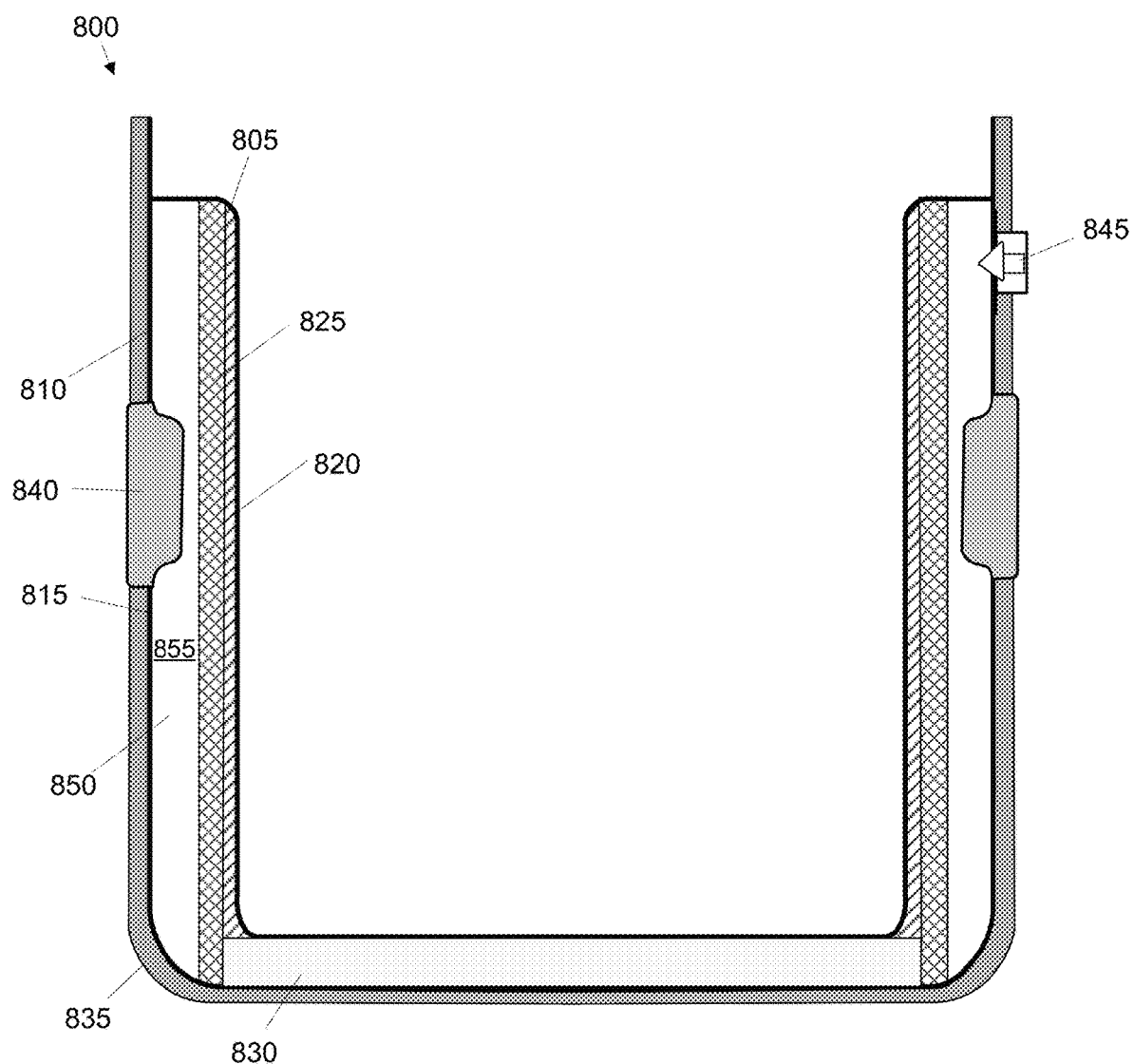
FIG. 8 illustrates a double walled vessel of the microwave cooking apparatus according to some embodiments.

In some embodiments, the cookware's thermal dynamic layer has a piece of ferrite rubber to insulate the vessel. FIG. 8 illustrates a double walled vessel 800 of the microwave cooking apparatus with such a thermal dynamic layer 850. As shown, the inner shell 805 is disposed adjacent the outer shell 810, and the edges of the shells are (e.g., hermetically) sealed to form the thermal dynamic layer 850 between the two shells. In some embodiments, the inner or outer shell is made using at least one of aluminum, stainless steel, carbon steel, copper, and clad metal.

In some embodiments, the cavity 850 is filled at least partially with a thermal conductive medium to form a thermodynamic layer that can absorb and retain heat for an extended period time. As mentioned above, different embodiments can use different thermal conductive mediums. In the example of FIG. 8, to absorb and transfer heat, the thermodynamic layer 850 includes a piece of ferrite rubber 820 and a piece of fibrous material 825. The ferrite rubber may be attached (e.g., glued) to the surface of one of the two shells (805 or 810). For instance, the piece of ferrite rubber 820 is attached to the outer surface of the inner shell 805. The rubber 820 may wrap around the inner shell 805 as illustrated in the figure.

In some embodiments, the rubber 820 is attached to the outer side wall and/or the outer bottom surface of the inner shell 805. In conjunction with the inner shell or instead of it, a piece of ferrite rubber may be attached to the inner surface of the cookware's outer shell 810. In some embodiments, instead of ferrite rubber, the cookware uses a different material (e.g., PPS or SPS with exothermic particles). In some embodiments, the cookware uses silicone rubber with exothermic particles.

In some embodiments, the inner chamber 850 includes multiple layers of different materials. For instance, in the example of FIG. 8, the cavity 850 includes a layer of ferrite rubber 820 and a layer of fibrous material 825. In some embodiments, the fibrous material 825 is ceramic wool or fiberglass wool to increase thermal conductivity for about 4-5 hours. One of the reasons for using such wool is because of its ability to remain stable in a high-temperature setting. Also, the wool is used because of its thermal insulation performance. In some embodiments, the inner chamber 850 has a piece of foam to keep food items hot for several hours. In some embodiments, the foam is made of polyurethane.

As mentioned above, in some embodiments, the inner chamber includes a fibrous medium, such as ceramic wool. In some embodiments, the inner chamber 850 includes a quilted panel or a thin bendable board made of microporous material. In some embodiments, the thermal conductive medium 825 may be attached in some manner to the ferrite rubber 825. As illustrated, there may be a space or an area 855 in the inner chamber 850 to hold a pocket of air. The air may act as a third insulating member in addition to the rubber 820 and the medium 825. The space also allows the materials 820 and 825 to expand when the vessel is heated. In some embodiments, the thermal conductive medium 825 (e.g., the quilted panel, the thin sheet) may fill out the remaining area next to the ferrite rubber 825.

In some embodiments, the inner chamber 850 is at least partially filled with a chemical gel. In some embodiments, the chemical gel includes ammonium nitrate, calcium chloride, sodium chloride, sodium acetate, and ammonium chloride. One of the benefits of using such a gel is for its endothermic performance or its ability to absorb heat. That is, the gel can be used to keep food cold for an extended period of time.

In some embodiments, the cookware's outer shell 810 is covered with a layer of material to insulate the vessel and to make the vessel safe to handle. In the example of FIG. 8, the outer surface and the handle area of the outer shell 810 are covered with layers of heat insulating materials. Specifically, the figure shows an outer cover 835 and a set of cool touch handles 840 that insulate the vessel and make it safe to touch. In some embodiments, the thermal insulating member (835 or 840) is made of a polymer such as polyphenylene sulfide (PPS). In some embodiments, the thermal insulating member (835 or 840) is made with PPS plastic. In some embodiments, the thermal insulating member is made of silicone rubber. In some embodiments, the PPS plastic, SPS, or silicone rubber may be exothermic in that it was mixed with exothermic particles. In some embodiments, the outer cover 835 has exothermic particles while the handle 840 does not have such particles.

In the example of FIG. 8, the outer cover 835 covers the outer surface of the outer shell 815. For instance, the outer side wall and the outer bottom surface of the outer shell are surrounded by the cover layer 835. As will be described below by reference to FIG. 9, the cover layer may only cover the bottom portion of the outer shell.

In some embodiments, the microwave cooking apparatus 800 has an exothermic plate 830. In some embodiments, the exothermic plate 830 is a ceramic plate. Alternatively, the exothermic plate can be a clay plate (e.g., clay ceramic plate). For exothermic performance, the clay plate may be blended with ferrite (Fe) powder, and manganese (Mn) and zinc (Zn) silicate powder.

Finally, as shown in FIG. 8, the cookware 800 of some embodiments has a pressure release valve 845. There is a hole in the outer shell 810. The valve 845 covers that hole and lets out excess pressure built up within the inner chamber 850 of the doubled walled vessel.

Figure 9:
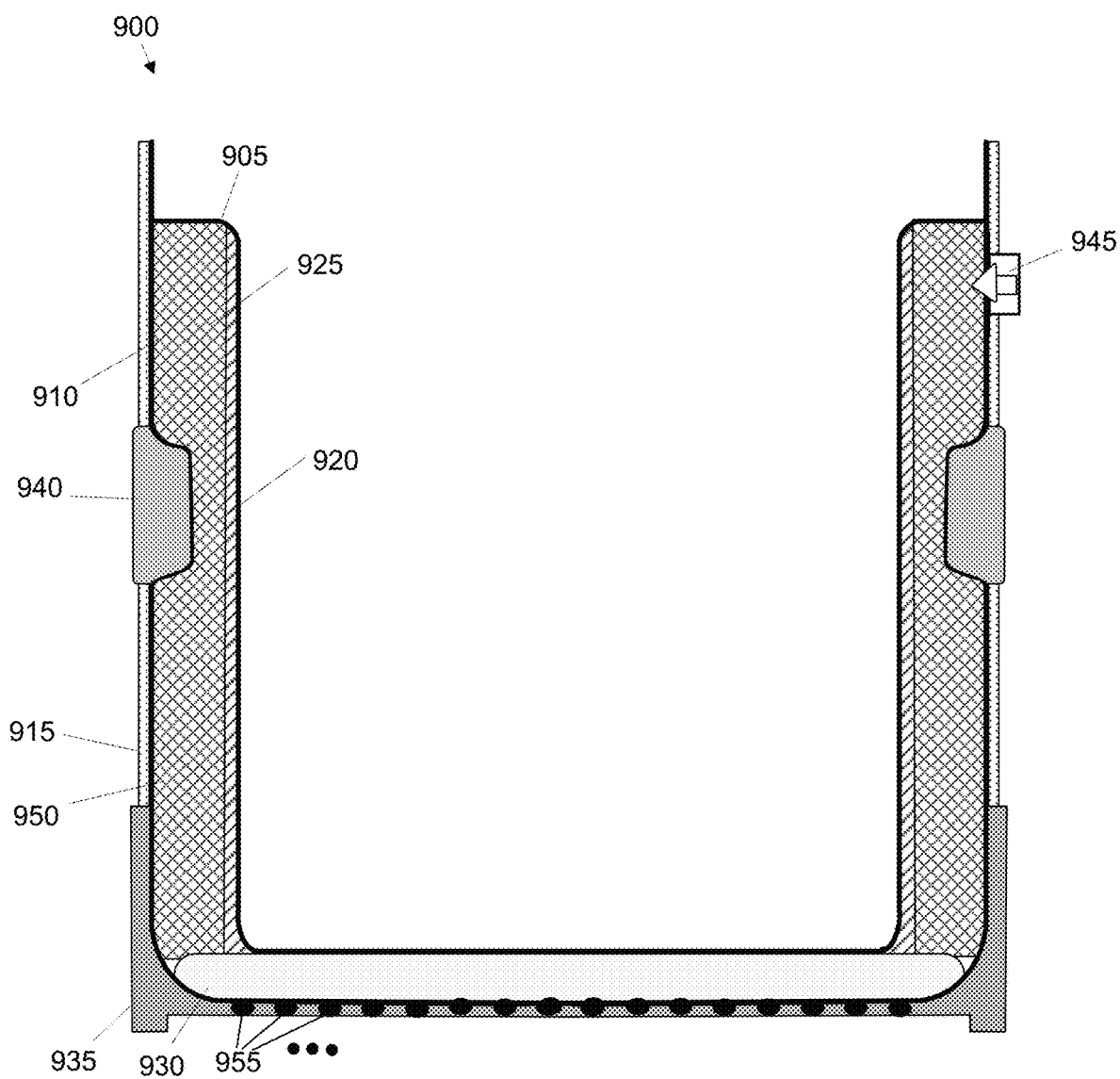
FIG. 9 illustrates a double walled vessel of the microwave cooking apparatus according to some embodiments.

FIG. 9 illustrates yet another example of a microwave cooking apparatus 900 according to some embodiments of the invention. This figure is similar to the previous figure. Different from the previous figure, the current figure shows that at least a portion of the cookware's outer surface of the inner shell 910 is coated with an exothermic powder coat 920 and at least a portion of the outer surface of the outer shell is coated with a ceramic coat 915. Each coating (910 or 915) may include Fe, Mn, and Zn as exothermic particles.

Also different from the previous figure, FIG. 9 shows that only the outer bottom surface of the cookware 900 and the handle area can be covered with layers of heat insulating materials. The previous figure showed that the entire side wall can be covered with the cover layer 935. For instance, if some type of plastic is used, it may only cover the outer bottom surface and/or the handle area.

Further, different from the previous figure, the thermal conductive medium 925 (e.g., the quilted panel, the thin sheet) fills out the remaining area next to the ferrite rubber 925. Further, different from the previous figure, FIG. 9 shows that the cookware 900 of some embodiments has an outer bottom cover 935 with a number of vent holes 955. The outer bottom cover may be made from PPS plastic. PPS plastic is used because it has high heat resistance. The PPS may be exothermic in that it is mixed with exothermic particles. In some embodiments, the outer bottom cover is made with silicone rubber.

Similar to the previous figure, FIG. 9 shows that the inner chamber of the vessel can include a piece of fibrous material 920. Further, the cookware 900 can have a set of one or more cool touch handles (e.g., made of silicone rubber that wraps around the outer surface of the outer shell 910). In addition, the cookware can have a safety valve 945 to relieve excess pressure within the inner chamber 950.

Figure 10:
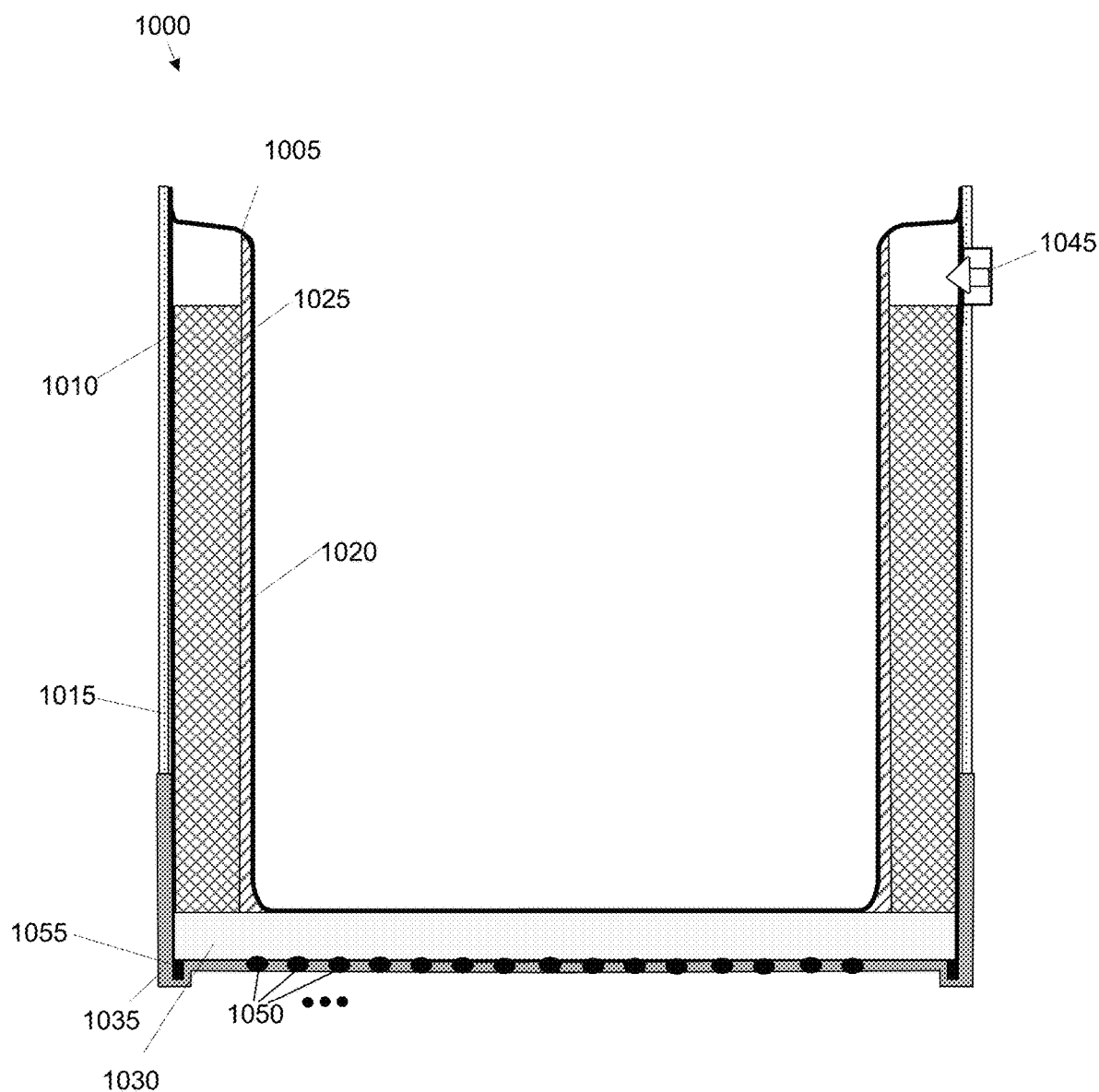
FIG. 10 illustrates a double walled vessel of the microwave cooking apparatus according to some embodiments.

FIG. 10 illustrates yet another example of a microwave cooking apparatus 1000 according to some embodiments of the invention. This figure is similar to the previous figure. The main differences between the current figure and the previous figure are that the cookware 1000 shown in the current figure is footed. That is, a set of one or more bottom support members 1035 is attached to or formed on the outer bottom surface of the outer shell. Also, the cookware of FIG. 10 does not have the set of cool touch handles 940.

Figure 11:
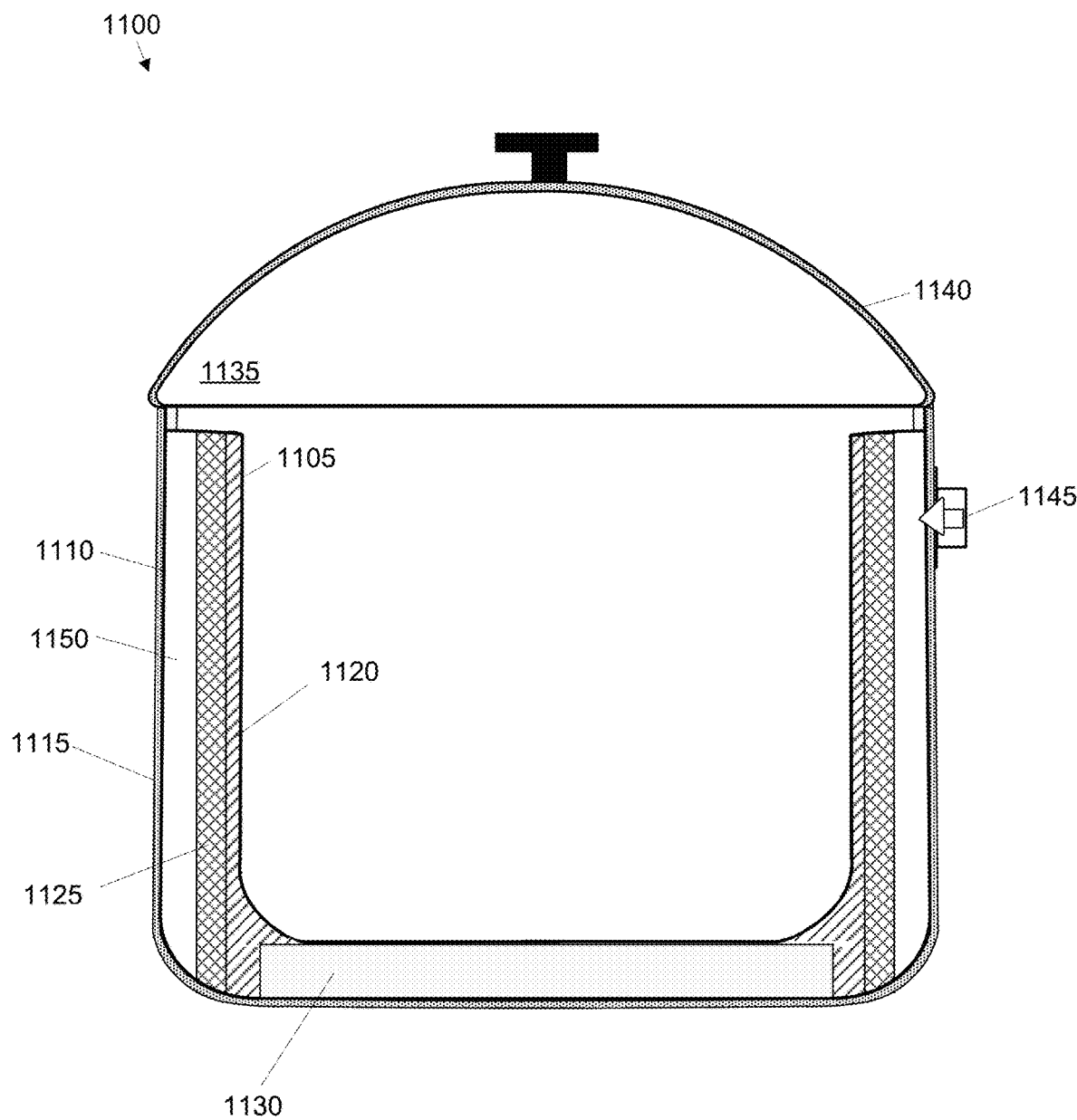
FIG. 11 illustrates a double walled infrared cookware according to some embodiments.

FIG. 11 illustrates yet another example of a microwave cooking apparatus 1100 according to some embodiments of the invention. As shown, the cookware's inner shell 1105 is wrapped with a piece of ferrite rubber 1120. The rubber may 1120 be attached to a portion of the outer surface of the inner shell 1105. The cookware 1100 also has a piece of fibrous material 1125 (e.g., ceramic wool fiber, fiberglass woven fabric, etc.) for added insulation. The outer surface of the cookware is also coated with an exothermic ceramic coat. In the example of FIG. 11, the coating 1115 is on the outer surfaces of the lid 1135 and outer shell 1110. FIG. 11 also shows that the cookware 1100 of some embodiments has a pressure release valve 1145 and an exothermic ceramic or clay ceramic plate 1130.

Figure 12:
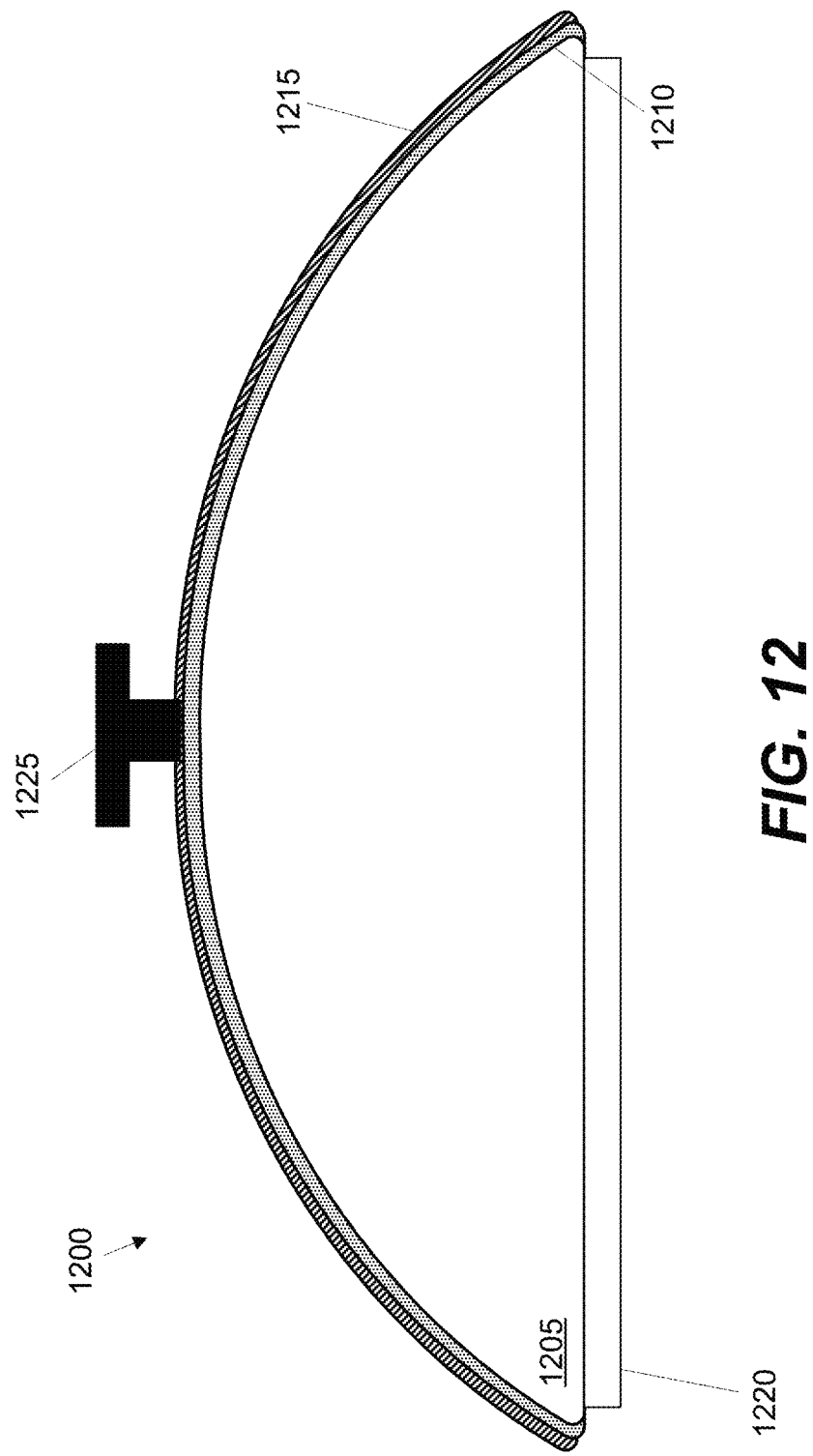
FIG. 12 shows an exothermic infrared cover according to some embodiments of the invention.

In some embodiments, the cookware includes an exothermic infrared cover that generates and traps heat. FIG. 12 shows such an exothermic infrared cover 1200 according to some embodiments of the invention. As shown, the cover 1200 includes at least one exothermic layer 1215. In some embodiments, the exothermic layer 1215 has a layer of ferrite rubber. The rubber may be coated on or attached to the outer surface of the plate 1205 of the cover 1200. In some embodiments, the exothermic layer 1210 is an exothermic ceramic coat.

In some embodiments, the cover 1200 includes a heat-resistant outer layer 1215 (e.g., thermal insulation layer). The heat-resistant outer layer 1215 may cover the exothermic layer 1210. In some embodiments, the heat-resistant outer layer 1215 serves multiple purposes. The heat-resistant outer layer may insulate the vessel by trapping heat. The heat-resistant outer layer 1215 may make the cover 1200 safe to touch when heated. Different embodiments use different materials for the heat-resistant outer layer. In some embodiments, the heat-resistant layer is composed of polystyrene such as syndiotactic polystyrene (SPS). In some embodiments, the heat-resistant layer is composed of a polymer such polyphenylene sulfide (PPS). The vessel of some embodiments uses such a polystyrene or polymer because it has heat resistance up to and excess of 260° C.

In some embodiments, the lid has a disk 1205 made of PPS plastic. In some embodiments, the lid has a disk made with SPS plastic. In some embodiments, the lid has a disk made with silicone rubber. The PPS plastic, SPS plastic, or silicone rubber may be mixed with exothermic particles.

In some embodiments, the exothermic particles include $Fe_2O_3$ powder with Manganese (Mn) and Zinc (Zn) powder, or copper-nickel-zinc (Cu—Ni—Zn) powder for electro-microwave absorption. In some embodiments, the lid has a metal disk made of stainless steel, aluminum, or carbon steel.

Figure 13:
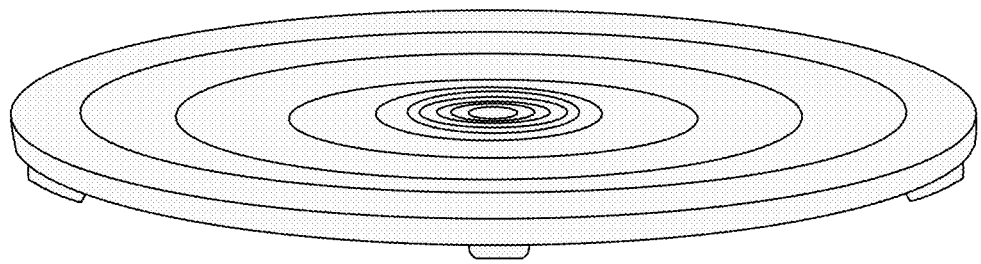
FIG. 13 illustrates a heating element of the microwave cooking apparatus according to some embodiments.

As mentioned above, the multi-purpose microwave cookware of some embodiments has an elastic heating element. FIG. 13 illustrates a heating element 1300 of the microwave cooking apparatus according to some embodiments. The heating element 1300 has a top face and a bottom face, and the top face attached to the outer bottom surface of the microwaveable vessel. In some embodiments, the heating element 1300 is attached to the outer bottom surface by a heat press process. The heat press process can include the following steps: applying a layer of adhesive to the outer bottom surface of the vessel, drying the vessel for about an hour in an area having a temperature about 180° C. and pressing the heating element onto vessel at temperatures ranging between 150-250° C. This heat-press process removes excess water, minimizes shrinkage, and ensures greater resistance to high temperature, moisture, and physical abuse.

In some embodiments, the heating element 1300 is ferrite rubber, which is a mixture of ferrite particles having the general chemical formula $MOFe_2O_3$, where MO is one or more divalent metal oxides combined with 48 to 60 mole percent of iron oxide, and elastic material. In some embodiments, the elastic material is silicon rubber capable of withstanding temperatures up to at least the transitional temperature of the ferrite particles, which is temperature marking the change of the particles from a ferromagnetic to paramagnetic state. In some embodiments, the elastic material is silicon rubber capable of withstanding at least 260° Celsius (C).

The use of ferrite rubber as a heating element 1300 offers several advantages over coating a vessel with ferrite particles. First, it is durable in that it is flexible and strong enough to be used in demanding conditions such as in a microwave oven or in a sink. It is also durable in that it protects the magnetic properties of the ferrite particles by being moisture resistant. Secondly, it is moldable in that it can be molded into varying shape or size. For example, in some embodiment, several legs are molded or formed on the bottom face of the heating element 1300. This eliminates the manufacturing steps of separately attaching the legs onto the bottom face of the heating element.

Figure 14:
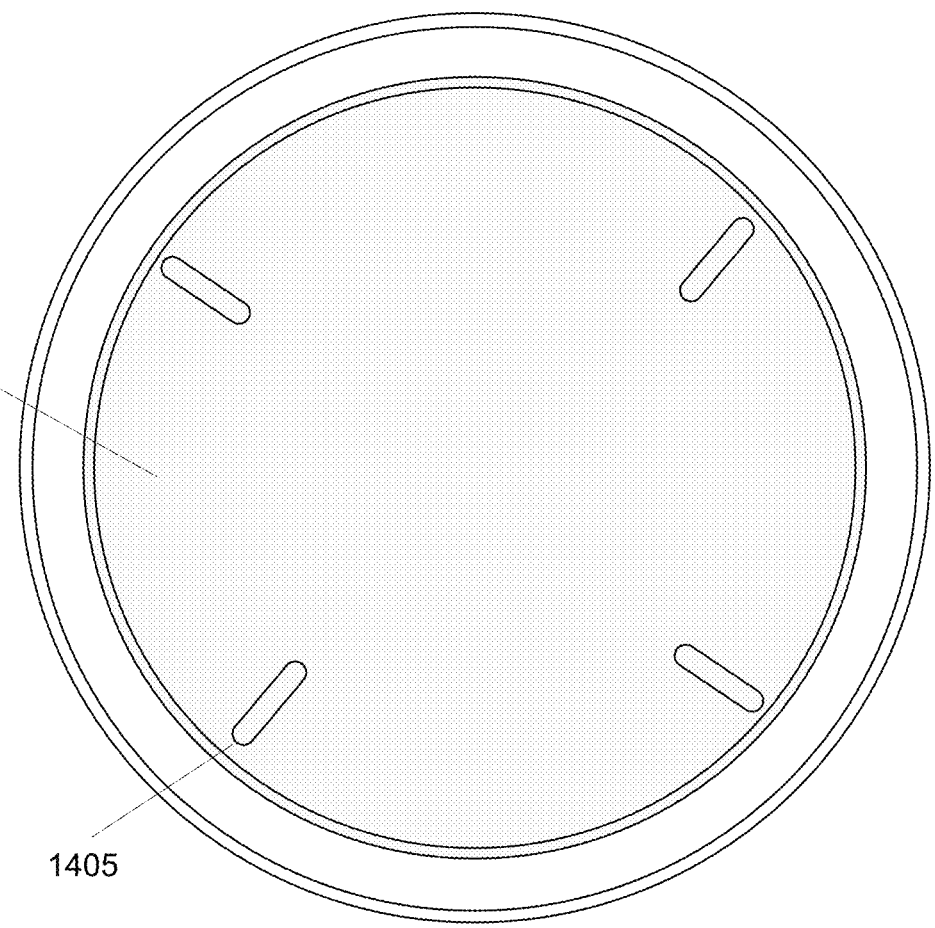
FIG. 14 illustrates a bottom plan view of the heating element of FIG. 13.

FIG. 14 illustrates a bottom plan view of the heating element of FIG. 13. Provided on the bottom face 1400 of the heating element 1400 is a plurality of thermal insulating members 1405 or legs. In some embodiments, at least four legs are geometrically arranged or formed on the bottom face of the heating element 1400 to provide support for the vessel 1410. The thermal insulating members 1405 are narrow-shaped so as to make minimal contact with the inner surface or turntable of the microwave oven, and thus provide insulation to the vessel by ensuring that the thermal energy stored in the heating element 800 is not rapidly transferred to the inner surface of the microwave oven.

Figure 15:
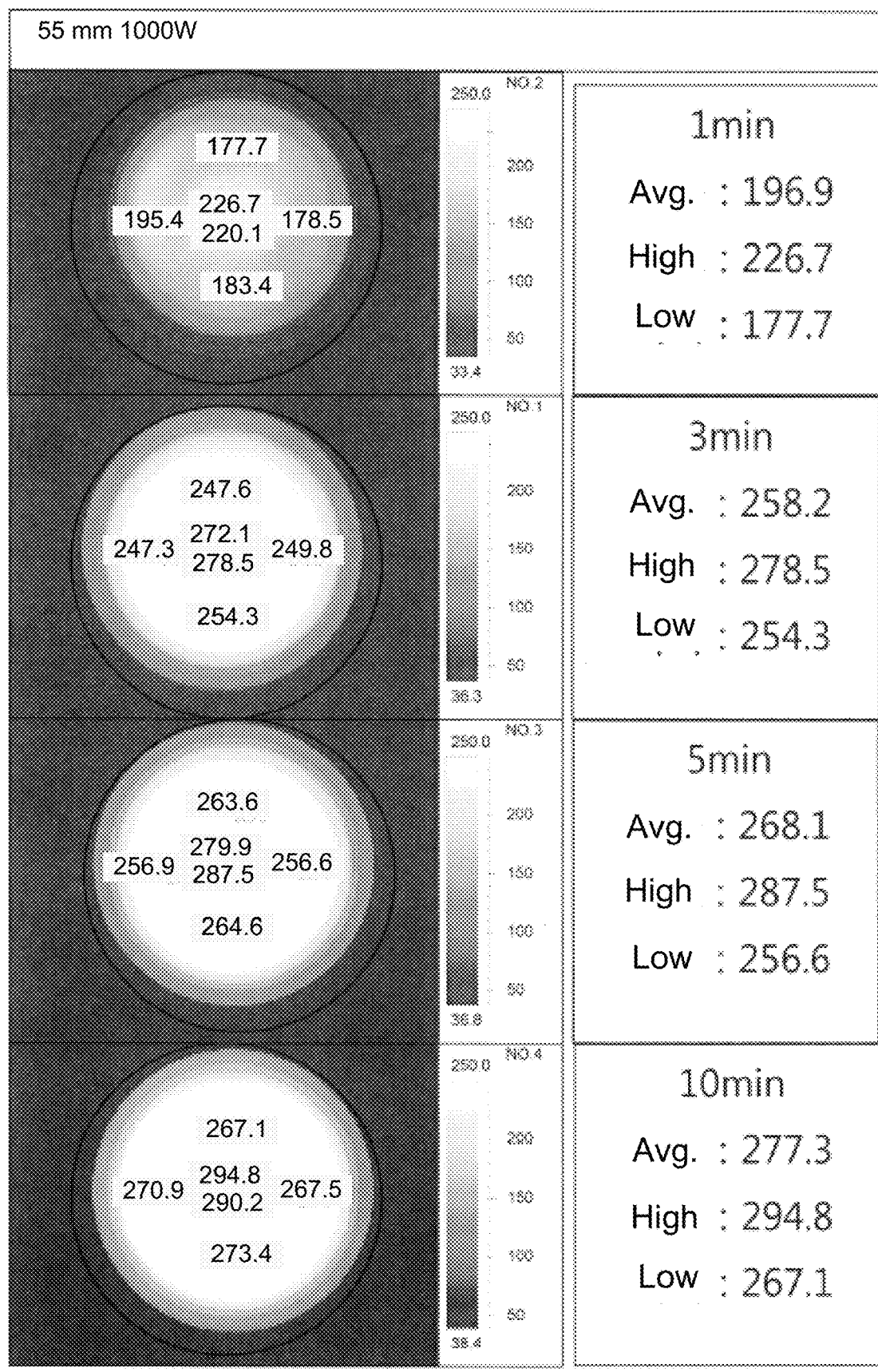
FIG. 15 shows the results of a first exothermic test performed on a microwave vessel with a piece of ferrite rubber.

FIG. 15 shows the results of an exothermic test performed on a microwave vessel with a piece of ferrite rubber. Specifically, this figure shows an exothermic test for a pan that has a diameter of 55 mm. The ferrite rubber is the primary heating element for the test. The test was performed with a 1000 Watt (W) microwave oven. The results show the temperature in degrees Celsius (C).

As shown in FIG. 15, the results include four sets of data. The first set of data has temperature measurements after heating the vessel for just 1 minute with the microwave oven. The average temperature was measured at 196.9° C. The high temperature was measured at 2267° C. The high was based on a temperature reading from the center of the pan. The low temperature was measured at 177.7° C. The low was based on a temperature reading from the outer edge of the pan. The first set of data also includes a graphical representation of the pan with the temperature reading of the different areas around the pan.

The second set of data has temperature measurements after heating the vessel for 3 minutes with the microwave oven. The average temperature was measured at 258.2° C. The high temperature was measured at 278.5° C. The high was based on a temperature reading from the center of the pan. The low temperature was measured at 254.3° C. The low was based on a temperature reading from the outer edge of the pan. The second set of data also includes a graphical representation of the pan with the temperature reading of the different areas around the pan.

The third set of data has temperature measurements after heating the vessel for 5 minutes with the microwave oven. The average temperature was measured at 268.1° C. The high temperature was measured at 287.5° C. The high was based on a temperature reading from the center of the pan. The low temperature was measured at 256.6° C. The low was based on a temperature reading from the outer edge of the pan. The third set of data also includes a graphical representation of the pan with the temperature reading of the different areas around the pan.

The fourth set of data has temperature measurements after heating the vessel for 10 minutes with the microwave oven. The average temperature was measured at 277.3° C. The high temperature was measured at 294.8° C. The high was based on a temperature reading from the center of the pan. The low temperature was measured at 267.1° C. The low was based on a temperature reading from the outer edge of the pan. The fourth set of data also includes a graphical representation of the pan with the temperature reading of the different areas around the pan.

Figure 16:
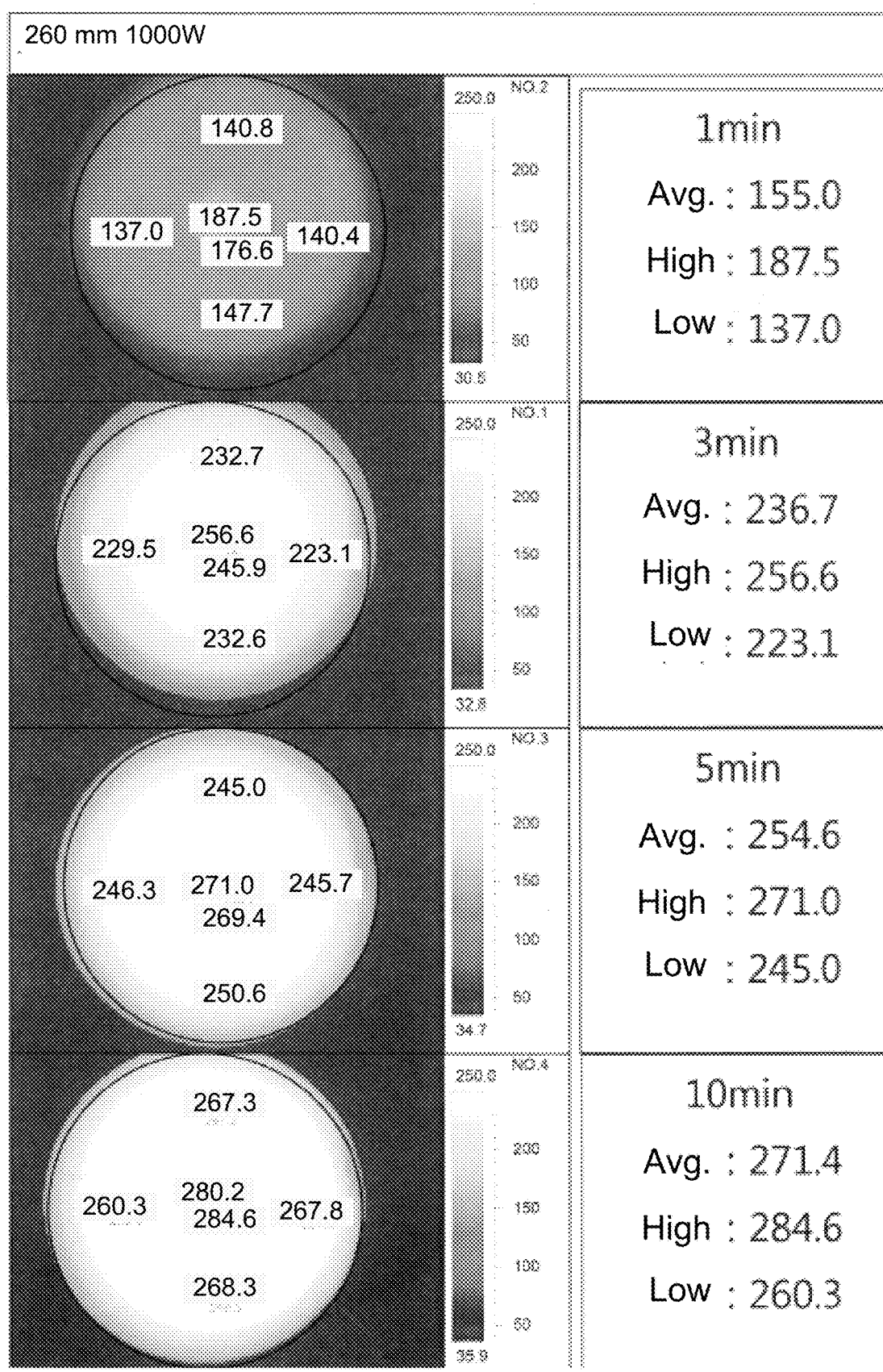
FIG. 16 shows the results of a second exothermic test performed on another microwave vessel with a piece of ferrite rubber.

FIG. 16 shows the results of a second exothermic test performed on a second microwave vessel with a piece of ferrite rubber. Specifically, this figure shows an exothermic test for a pan (e.g., a pizza pan) that has a diameter of 260 mm. The ferrite rubber is the primary heating element for this second text test. The test was performed with a 1000 Watt (W) microwave oven. The results show the temperature in degrees Celsius (C).

As shown in FIG. 16, the results include four sets of data. The first set of data has temperature measurements after heating the vessel for just 1 minute with the microwave oven. The average temperature was measured at 155.0° C. The high temperature was measured at 187.5° C. The high was based on a temperature reading from the center of the pan. The low temperature was measured at 137.0° C. The low was based on a temperature reading from the outer edge of the pan. The first set of data also includes a graphical representation of the pan with the temperature reading of the different areas around the pan.

The second set of data has temperature measurements after heating the vessel for 3 minutes with the microwave oven. The average temperature was measured at 236.7° C. The high temperature was measured at 256.6° C. The high was based on a temperature reading from the center of the pan. The low temperature was measured at 223.1° C. The low was based on a temperature reading from the outer edge of the pan. The second set of data also includes a graphical representation of the pan with the temperature reading of the different areas around the pan.

The third set of data has temperature measurements after heating the vessel for 5 minutes with the microwave oven. The average temperature was measured at 254.6° C. The high temperature was measured at 271.0° C. The high was based on a temperature reading from the center of the pan. The low temperature was measured at 245.0° C. The low was based on a temperature reading from the outer edge of the pan. The third set of data also includes a graphical representation of the pan with the temperature reading of the different areas around the pan.

The fourth set of data has temperature measurements after heating the vessel for 10 minutes with the microwave oven. The average temperature was measured at 271.4° C. The high temperature was measured at 284.6° C. The high was based on a temperature reading from the center of the pan. The low temperature was measured at 260.3° C. The low was based on a temperature reading from the outer edge of the pan. The fourth set of data also includes a graphical representation of the pan with the temperature reading of the different areas around the pan.

While the invention has been described with reference to numerous specific details, it is to be understood that the invention can be embodied in other specific forms without departing from the spirit of the invention. For instance, any one of the vessels described above without the coat of exothermic enamel glaze can be coated with that glaze. Thus, one of ordinary skill in the art would understand that the invention is not to be limited by the foregoing illustrative details, but rather is to be defined by the appended claims.

What is claimed is:

1. A microwave cooking apparatus:
   a metallic cookware vessel having a bottom surface, a side wall, and an edge, wherein an open region is defined with the side wall extending from the bottom surface to the edge, wherein at least a portion of an outer side wall is coated with a layer of exothermic coating to insulate the metallic cookware vessel and generate thermal energy from microwave radiation,
   wherein the outer side wall and an outer bottom surface of the metallic cookware vessel are coated with the exothermic coating, the exothermic coating is covered over with polyphenylene sulfide (PPS) plastic, the polyphenylene sulfide (PPS) plastic is covered over with heat resistance silicone rubber material, wherein the PPS plastic or the silicone rubber is mixed with exothermic particles for additional exothermic performance and electromagnetic wave absorption,
   a heating element configured to further generate thermal energy from the microwave radiation, the heating element comprising a mixture of elastic material and ferrite particles, wherein the heating element has a top face that is attached to the outer bottom surface of the metallic cookware vessel so as to distribute heat along the bottom of the metallic cookware vessel; and
   a lid having a handle to engage and disengage the lid onto the metallic cookware vessel, wherein at least one vent hole is formed on the lid to avow heated moisture to escape the metallic cookware vessel without disengaging the lid from the metallic cookware vessel.

2. The microwave cooking apparatus of claim 1, wherein the exothermic coating is an exothermic glaze having a mixed metal powder compound (Fe2O3) with ferrosilicon (Fe—Si) powder, aluminum silicate powder, and ethylene glycol.

3. The microwave cooking apparatus of claim 1, wherein the exothermic coating is a ceramic coat blended with exothermic particles.

4. The microwave cooking apparatus of claim 3, wherein the exothermic particles includes $Fe_2O_3$ powder with Manganese (Mn) and Zinc (Zn) powder, or copper-nickel-zinc (Cu—Ni—Zn) powder for elector-microwave absorption.

5. The microwave cooking apparatus of claim 1, wherein the metallic cookware vessel is formed using at least one of aluminum, stainless steel, copper, carbon steel, and clad metal.

6. The microwave cooking apparatus of claim 1, wherein an inner bottom surface and an inner side wall are coated with a layer of non-stick coating for non-stick cooking surface.

7. The microwave cooking apparatus of claim 1, wherein a plurality of legs are formed on a bottom face of the elastic material to raise the metallic cookware vessel in order to prevent rapid heat loss.

8. The microwave cooking apparatus of claim 1, wherein the lid has a disk made of polyphenylene sulfide (PPS) plastic with an exothermic coat.

9. The microwave cooking apparatus of claim 1, wherein the lid has a disk made of stainless steel, aluminum, carbon steel, PPS, silicone rubber, or syndiotactic polystyrene (SPS).

10. The microwave cooking apparatus of claim 1, wherein the lid has a dome-shaped disk.

11. The microwave cooking apparatus of claim 10, wherein the lid comprises an elastic ring to fit into the metallic cookware vessel to seal and cover the metallic cookware vessel, wherein the elastic ring is attached to an outer edge of the disk and sits between the disk and the metallic cookware vessel when the lid is placed over the metallic cookware vessel so that the disk does not make contact with the metallic cookware vessel, and there is a predetermined amount of space between the outer edges of disk and the metallic cookware vessel in order to prevent arcing or sparks from appearing between the outer edges of the lid and the metallic cookware vessel.

12. The microwave cooking apparatus of claim 1, wherein the handle is wrapped with a protective member to make the handle safe to touch when the metallic cookware vessel is heated.

13. A microwave cooking apparatus:
    a metallic cookware vessel having a bottom surface, a side wall, and an edge, wherein an open region is defined with the side wall extending from the bottom surface to the edge,
    a heating element adapted to generate thermal energy from microwave radiation, the heating element comprising a mixture of elastic material and ferrite particles, wherein the outer side wall and an outer bottom surface of the metallic cookware vessel are coated with the exothermic coating, the exothermic coating is covered over with polyphenylene sulfide (PPS) plastic, the polyphenylene sulfide (PPS) plastic is covered over with heat resistance silicone rubber material, wherein the PPS plastic or the silicone rubber is mixed with exothermic particles for additional exothermic performance and electromagnetic wave absorption; and
    a lid adapted to cover the metallic cookware vessel, said lid having a glass disk that is surrounded by a non-metallic rim, said non-metallic rim comprising an elastic ring that fits into the metallic cookware vessel and sits on the edge of the metallic cookware vessel to seal the metallic cookware vessel,
    wherein at least one vent hole is formed on the lid to allow heated moisture to escape the metallic cookware vessel without disengaging the lid from the metallic cookware vessel.

14. The microwave cooking apparatus of claim 13, wherein the glass disk is made with tempered glass, and wherein the glass disk is a dome-shaped.

15. The microwave cooking apparatus of claim 13, wherein the non-metallic rim is a silicone rim, and the elastic ring is a silicone ring formed on the silicone rim.

16. The microwave cooking apparatus of claim 13, wherein the metallic cookware vessel has an upper outer edge and a lower inner edge, wherein the non-metallic rim has a diameter that allows the dm to fit into the metallic cookware vessel so that the silicone ring sits on the lower inner edge.

17. The microwave cooking apparatus of claim 13, wherein a hole is formed on the center of the glass disk, and a coupling member is inserted in the hole to couple the glass disk to the handle.

* * * * *